United States Patent
Saito et al.

(10) Patent No.: US 7,136,928 B2
(45) Date of Patent: Nov. 14, 2006

(54) COMMUNICATION DEVICE AND COMMUNICATION CONTROL METHOD USING EFFICIENT ECHONET ADDRESS DETERMINATION SCHEME

(75) Inventors: Takeshi Saito, Tokyo (JP); Keiichi Teramoto, Kanagawa (JP); Nobuyuki Monma, Kanagawa (JP); Hiroyuki Aizu, Kanagawa (JP); Shuichi Kyuma, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 767 days.

(21) Appl. No.: 10/283,176

(22) Filed: Oct. 30, 2002

(65) Prior Publication Data

US 2003/0093542 A1    May 15, 2003

(30) Foreign Application Priority Data

| Nov. 1, 2001 | (JP) | ............................. 2001-336966 |
| Nov. 27, 2001 | (JP) | ............................. 2001-361350 |
| Jan. 29, 2002 | (JP) | ............................. 2002-020449 |

(51) Int. Cl.
  *G06F 15/16*   (2006.01)
  *G06F 15/173*  (2006.01)
  *H04L 12/28*   (2006.01)

(52) U.S. Cl. ...................... 709/230; 709/220; 709/226; 709/227; 709/245; 713/200; 370/257; 370/402

(58) Field of Classification Search ..................... None
  See application file for complete search history.

(56) References Cited

U.S. PATENT DOCUMENTS

| 6,457,061 | B1 * | 9/2002 | Bal et al. ..................... 709/245 |
| 6,542,510 | B1 * | 4/2003 | Fujimori et al. ............. 370/402 |
| 6,658,474 | B1 * | 12/2003 | Kang .......................... 709/227 |
| 6,801,507 | B1 * | 10/2004 | Humpleman et al. ....... 370/257 |
| 6,904,466 | B1 * | 6/2005 | Ishiyama et al. ........... 709/245 |
| 6,947,398 | B1 * | 9/2005 | Ahmed et al. ............... 370/331 |
| 2002/0052960 | A1 * | 5/2002 | Trisno et al. ............... 709/226 |
| 2002/0083331 | A1 * | 6/2002 | Krumel ..................... 713/200 |
| 2002/0169886 | A1 * | 11/2002 | Saito et al. ................. 709/230 |
| 2003/0198349 | A1 * | 10/2003 | Aizu et al. .................. 380/277 |
| 2004/0014475 | A1 * | 1/2004 | Saito et al. ................. 455/445 |
| 2005/0240665 | A1 * | 10/2005 | Gu et al. .................... 709/220 |

FOREIGN PATENT DOCUMENTS

| JP | 57-57057 | 4/1982 |
| JP | 3-135130 | 6/1991 |
| JP | 4-82439 | 3/1992 |
| JP | 11-205338 | 7/1999 |
| JP | 2000-269991 | 9/2000 |
| JP | 2001-45007 | 2/2001 |

* cited by examiner

Primary Examiner—John Follansbee
Assistant Examiner—Philip Lee
(74) Attorney, Agent, or Firm—Oblon, Spivak, McClelland, Maier & Neustadt, P.C.

(57) ABSTRACT

In a communication device for carrying out communications according to an Echonet protocol on a network of a prescribed network layer protocol, a prescribed bit sequence value of a network layer address or a datalink layer address of the communication device is set as a candidate for an Echonet address to be used in the Echonet protocol. Then, an inquiry packet for inquiring whether the prescribed bit sequence value is identical to the Echonet address used by each other communication device or not is transmitted, and the prescribed bit sequence value is determined as the Echonet address of the communication device when the prescribed bit sequence value is judged as not identical to any of Echonet addresses used by the other communication devices.

3 Claims, 17 Drawing Sheets

FIG. 3B

| ALREADY USED ECHONET ADDRESS |
|---|
| Ex |
| Ey |
| Ez |
| ⋮ |

FIG. 3A

| IP ADDRESS | ECHONET ADDRESS (NODE ID) |
|---|---|
| IPo (LINK LOCAL ADDRESS) | — |
| IPa (LINK LOCAL ADDRESS) | Ea |
| IPb (LINK LOCAL ADDRESS) | Eb |
| ⋮ | ⋮ |

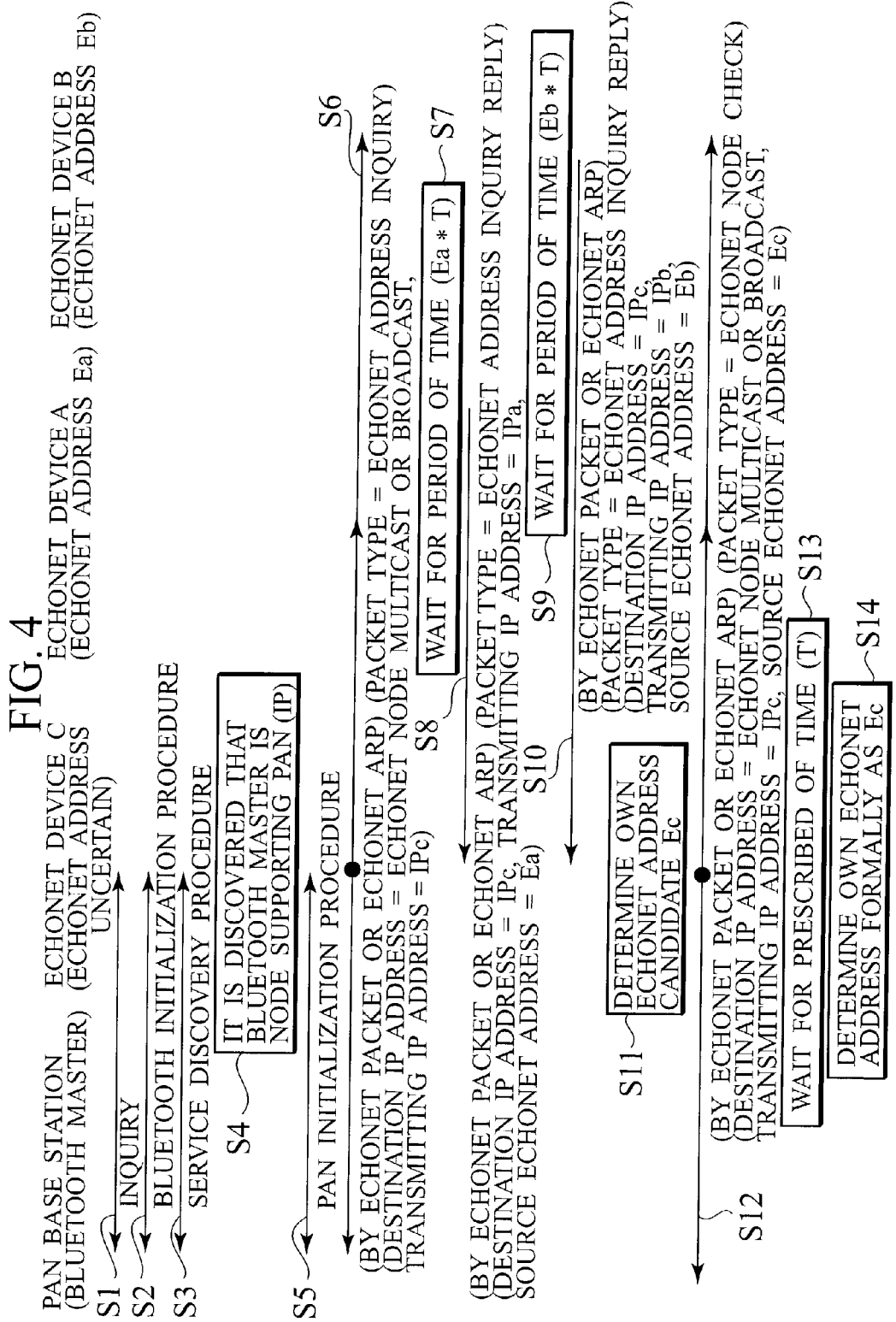

FIG. 7

| DESTINATION IP ADDRESS | TRANSMITTING IP ADDRESS | PORT NUMBER = ECHONET | PACKET TYPE NODE CHECK, ADDRESS REQUEST, ADDRESS ASSIGNMENT, ADDRESS ASSIGNMENT REPLY, ADDRESS INQUIRY, ADDRESS INQUIRY REPLY, ARP REQUEST, ARP REPLY, ECHONET PACKET, ETC. | ECHONET VERSION = 1 | LOWER LAYER TYPE = BLUETOOTH | PACKET TYPE DEPENDENT FIELD |
|---|---|---|---|---|---|---|

FIG. 10 A

| HARDWARE ADDRESS (BLUETOOTH ADDRESS) | IP ADDRESS | ECHONET ADDRESS (NODE ID) |
|---|---|---|
| Lo | IPo | — |
| La | IPa | Ea |
| Lb | IPb | Eb |
| ... | ... | ... |

FIG. 10 B

| ALREADY USED ECHONET ADDRESS |
|---|
| Ex |
| Ey |
| Ez |
| ... |

FIG. 13

| DESTINATION IP ADDRESS | TRANSMITTING IP ADDRESS | PORT NUMBER = ECHONET | PACKET TYPE NODE CHECK, ADDRESS SERVER CHECK, ADDRESS REQUEST, ADDRESS ASSIGNMENT, ADDRESS ASSIGNMENT REPLY, ADDRESS INQUIRY, ADDRESS INQUIRY REPLY, ARP REQUEST, ARP REPLY, ECHONET PACKET, ETC. | ECHONET VERSION = 1 | LOWER LAYER TYPE = BLUETOOTH | PACKET TYPE DEPENDENT FIELD |
|---|---|---|---|---|---|---|

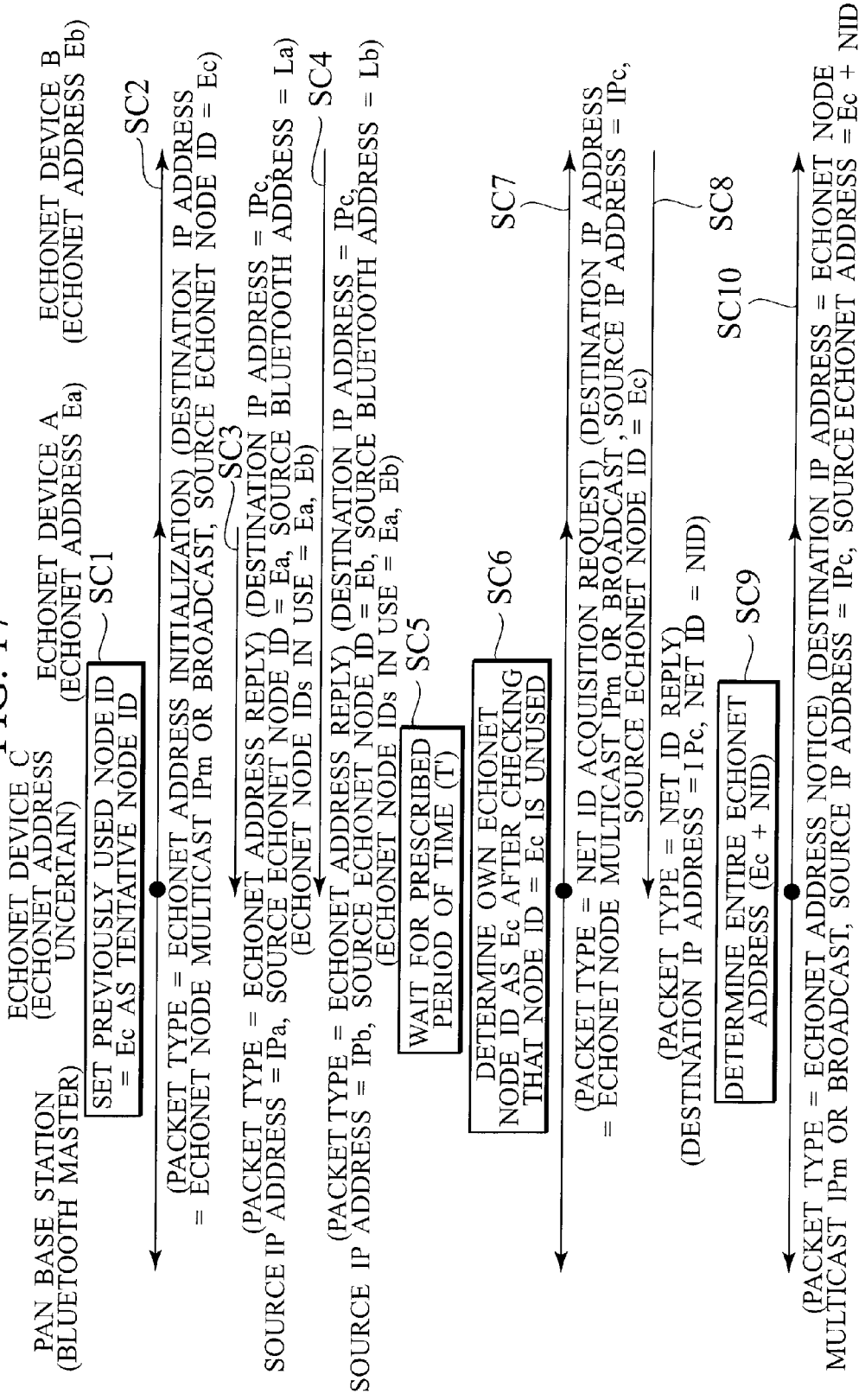

COMMUNICATION DEVICE AND COMMUNICATION CONTROL METHOD USING EFFICIENT ECHONET ADDRESS DETERMINATION SCHEME

BACKGROUND OF THE INVENTION

1. Field of the Invention

The present invention relates to a communication device and a communication control method for carrying out communications according to a control protocol such as Echonet on a network using a network layer protocol such as IP (Internet Protocol).

2. Description of the Related Art

In recent years, the information home electronics have been developing rapidly. This field encompasses a wide variety of devices such as home appliances, AV home electronics, information devices or mobile devices such as PCs, etc., and various applications utilizing the digital technology have been proposed for each device.

One such application is the use of a home network. The home network is a network technology developed for a network inside the home, for interconnecting various information home electronics mentioned above.

As this home network technology, the Internet technology has been attracting much attentions recently. For example, many applications that are attractive to the home network users such as those of music distribution, home page viewing, e-mails, etc., have been developed and the number of users is steadily increasing.

On the other hand, one exemplary application of the home network is a facility related network, or the use of the home network for the home automation. It is possible to connect air conditioners, lights, home appliances, etc., to the home network and carry out applications such as device state monitoring, remote controlling, etc.

In Japan, the Echonet is expected to be the de facto standard for this facility related network. The Echonet defines commands, protocols, objects, API, etc. for controlling facility related devices (home appliances, etc.) on various physical media such as electric power lines, twisted pair lines, etc. Further details of the Echonet can be found in documents disclosed at the URL "http://www.echonet.gr.jp", for example. The Echonet is standardized by a consortium founded mainly by several Japanese electronics companies, which has already issued the specification version 1, and the commercial application is about to start.

The Echonet has its own address system, so that there is a need for a mechanism to use the address system of the Echonet on the address system of the Internet. To this end, it is necessary to account for things that have not been accounted so far, such as the determination of a correspondence relationship between the Echonet address and the Internet address. This is done by the Echonet address initialization procedure.

In the case of determining the Echonet address, it can be expected that an Echonet address server for determining the Echonet address may not necessarily exist, so that there is a need to provide a mechanism for determining the Echonet address independently. An example of such a mechanism is that in which "a candidate value for the Echonet address is selected and broadcasted on the local network to check the address overlap". In this mechanism, there is a possibility for a loop of "selecting a tentative address value→checking→discovering overlap→going back to start" to take some time. For this reason, there can be cases where the own Echonet address cannot be determined during some period of time after the activation.

In particular, in the case of implementing this mechanism on the radio scheme such as Bluetooth, because the Bluetooth has a limitation that the number of nodes (the number of slaves) that can actively carry out communications simultaneously is limited to be less than or equal to seven, there is a possibility for the above loop to require much time, especially in view of the fact that the above loop utilizes the broadcast processing.

BRIEF SUMMARY OF THE INVENTION

It is therefore an object of the present invention to provide a communication device and a communication control method capable of efficiently determining the own Echonet address.

It is another object of the present invention to provide a communication device and a communication control method in which one device that have broadcasted or multicasted packets can efficiently receive reply packets for the broadcasted or multicasted packets from a plurality of other devices.

According to one aspect of the present invention there is provided a communication device for carrying out communications according to a prescribed control protocol on a network of a prescribed network layer protocol, comprising: an interface unit configured to make connections to the network of the prescribed network layer protocol; a control protocol processing unit configured to carry out processing regarding data of the prescribed control protocol that are transmitted/received through the network of the prescribed network layer protocol; a memory unit configured to store address correspondence information that contains in correspondence a network layer address to be used by each communication device on the network of the prescribed network layer protocol and a prescribed address to be used by each communication device in the prescribed control protocol, for the communication device and other communication devices that are connected to the network of the prescribed network layer protocol; a transmission/reception unit configured to carry out transmission/reception of packets of the prescribed network layer protocol, in which packets of the prescribed control protocol are encapsulated; and a determination unit configured to set a prescribed bit sequence value of the network layer address or a datalink layer address of the communication device as a candidate for the prescribed address, transmit an inquiry packet for inquiring whether the prescribed bit sequence value is identical to the prescribed address used by each one of the other communication devices or not, to each one of the other communication devices connected to the network of the prescribed network layer protocol, and determine the prescribed bit sequence value as the prescribed address of the communication device when the prescribed bit sequence value is judged as not identical to any of prescribed addresses used by the other communication devices.

According to another aspect of the present invention there is provided a communication control method for controlling a communication device for carrying out communications according to a prescribed control protocol on a network of a prescribed network layer protocol, comprising: making connections to the network of the prescribed network layer protocol; carrying out processing regarding data of the prescribed control protocol that are transmitted/received through the network of the prescribed network layer protocol; storing address correspondence information that contains in correspondence a network layer address to be used by each communication device on the network of the prescribed network layer protocol and a prescribed address to be used by each communication device on the prescribed control protocol, for the communication device and other communication devices that are connected to the network of the prescribed network layer protocol; carrying out transmission/reception of packets of the prescribed network layer protocol, in which packets of the prescribed control protocol are encapsulated; setting a prescribed bit sequence value of the network layer address or a datalink layer address of the communication device as a candidate for the prescribed address; transmitting an inquiry packet for inquiring whether the prescribed bit sequence value is identical to the prescribed address used by each one of the other communication devices or not, to each one of the other communication devices connected to the network of the prescribed network layer protocol; and determining the prescribed bit sequence value as the prescribed address of the communication device when the prescribed bit sequence value is judged as not identical to any of prescribed addresses used by the other communication devices.

According to another aspect of the present invention there is provided a computer program product for causing a computer to function as a communication device for carrying out communications according to a prescribed control protocol on a network of a prescribed network layer protocol, the computer program product comprising: a first computer program code for causing the computer to make connections to the network of the prescribed network layer protocol; a second computer program code for causing the computer to carry out processing regarding data of the prescribed control protocol that are transmitted/received through the network of the prescribed network layer protocol; a third computer program code for causing the computer to store address correspondence information that contains in correspondence a network layer address to be used by each communication device on the network of the prescribed network layer protocol and a prescribed address to be used by each communication device on the prescribed control protocol, for the communication device and other communication devices that are connected to the network of the prescribed network layer protocol; a fourth computer program code for causing the computer to carry out transmission/reception of packets of the prescribed network layer protocol, in which packets of the prescribed control protocol are encapsulated; and a fifth computer program code for causing the computer to set a prescribed bit sequence value of the network layer address or a datalink layer address of the communication device as a candidate for the prescribed address, transmit an inquiry packet for inquiring whether the prescribed bit sequence value is identical to the prescribed address used by each one of the other communication devices or not, to each one of the other communication devices connected to the network of the prescribed network layer protocol, and determine the prescribed bit sequence value as the prescribed address of the communication device when the prescribed bit sequence value is judged as not identical to any of prescribed addresses used by the other communication devices.

Other features and advantages of the present invention will become apparent from the following description taken in conjunction with the accompanying drawings.

BRIEF DESCRIPTION OF THE DRAWINGS

FIGS. 3A and 3B are diagrams showing an exemplary internal structure of an address table in the Echonet device of FIG. 2.

FIG. 4 is a sequence chart for one exemplary overall sequence of the home network system of FIG. 1.

FIG. 7 is a diagram showing an exemplary format of an encapsulated Echonet packet according to the first embodiment of the present invention.

FIGS. 10A and 10B are diagrams showing an exemplary internal structure of an address table in the Echonet device according to the third embodiment of the present invention.

FIG. 13 is a diagram showing an exemplary format of an encapsulated Echonet packet according to the third embodiment of the present invention.

FIG. 17 is a sequence chart showing still another exemplary Echonet address initialization sequence according to the fourth embodiment of the present invention.

DETAILED DESCRIPTION OF THE INVENTION

Referring now to FIG. 1 to FIG. 7, the first embodiment of a communication device and a communication control method according to the present invention will be described in detail.

This first embodiment is directed to the case of operating the Echonet protocol on the IP network by mapping the Echonet protocol onto the IP (which can be either IPv4 or IPv6, for example).

Also, this embodiment is directed to the exemplary case of using a configuration for connecting nodes (such as various home appliances and their controllers, for example) by using the local radio network technology called Bluetooth. Here, the Bluetooth is a local radio network characterized by its low cost and low power consumption, and its further details can be found in documents disclosed at the URL "http://www.bluetooth.com", for example. In the following, the Bluetooth may be abbreviated as BT whenever convenient.

Also, on the Bluetooth, the "IP over Bluetooth" scheme is defined by the PAN (Personal Area Network) profile, and this embodiment is directed to the exemplary case of using this scheme. Here, the PAN is an Ethernet emulation specification defined on the Bluetooth such that it becomes possible to exchange Ethernet frames on the Bluetooth by using this mechanism.

Figure 1:
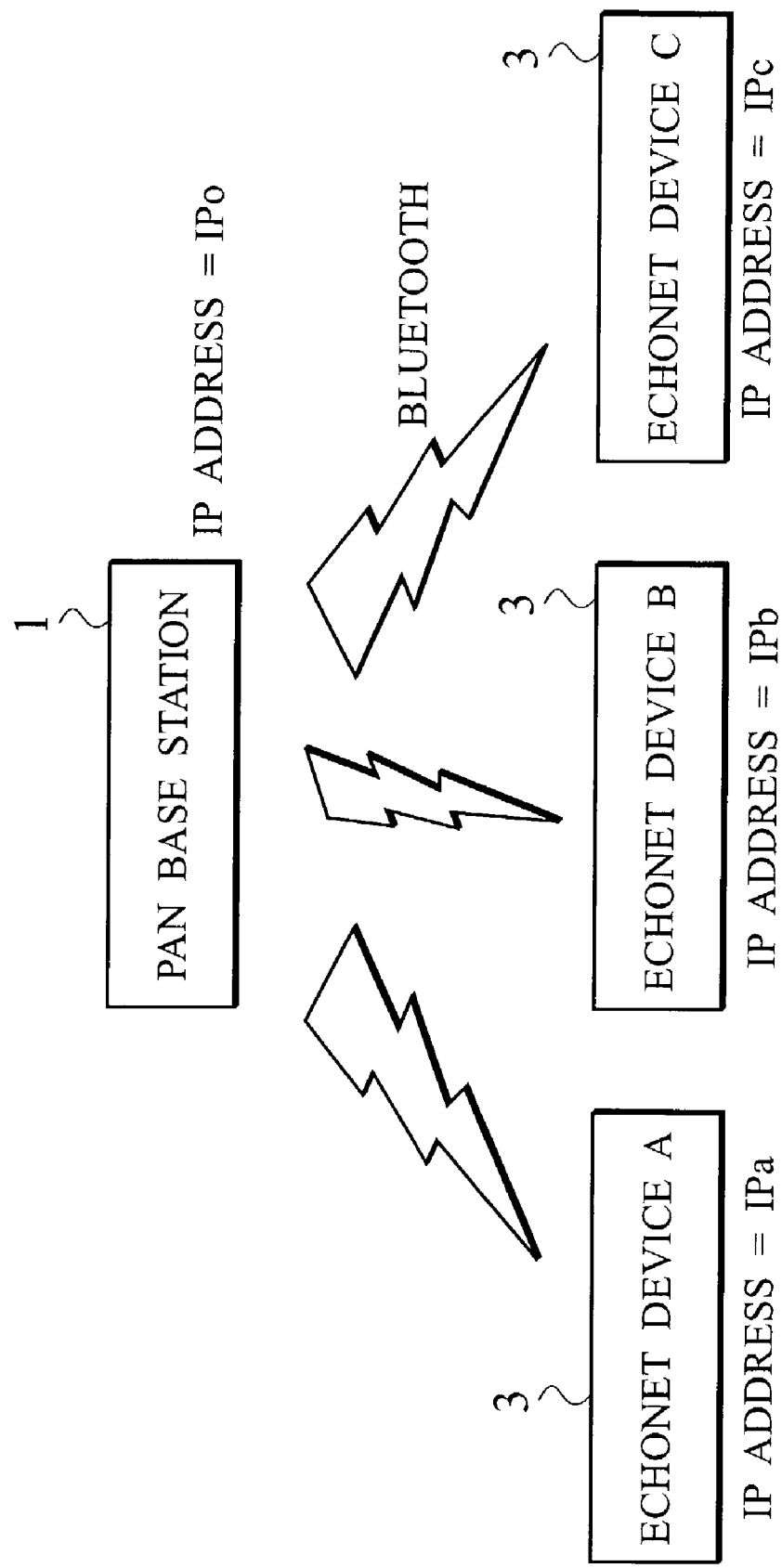
FIG. 1 is a diagram showing an exemplary configuration of a home network system according to the first embodiment of the present invention.

FIG. 1 shows an exemplary configuration of the home network system in this embodiment.

As shown in FIG. 1, in this home network system, a Bluetooth base station (also called PAN base station) 1 and a plurality (three in an example of FIG. 1) of Echonet devices 3 are interconnected through the Bluetooth.

The Bluetooth base station (PAN base station) 1 is a master of the Bluetooth piconet. In this embodiment, this Bluetooth base station 1 is assumed to be not an Echonet node (although the Bluetooth base station 1 may very WELL be an Echonet node).

The Echonet devices 3 can be any devices including home appliances, AV devices, information devices such as PCs, as long as they support the Echonet.

Note that the Bluetooth base station 1 may have a function for controlling (or monitoring) the Echonet devices 3 through the Bluetooth. It is also possible to provide a function for controlling (or monitoring) the Echonet devices through the Bluetooth at another node not shown in the figure.

Each one of these devices (the base station 1 and the Echonet devices A, B and C in FIG. 1) has an IP address. The IP address can be either an IPv4 address or an IPv6 address. Here, the IP address is assumed to be a link local address. The link local address is a special IP address, which can be used only on that link (which is the Bluetooth in this embodiment). This is a scheme that is used in the case where there is no need to give a globally unique IP address, but a specific application of the IP is to be operated on a local network (link network).

The Echonet protocol is a protocol developed by presupposing the local network as its target, so that it is preferable to use the link local address even on the IP, while the use of the link local address makes it possible to prevent erroneous accesses or malicious accesses to the Echonet operating range and the home appliances from outside of the home.

Figure 2:
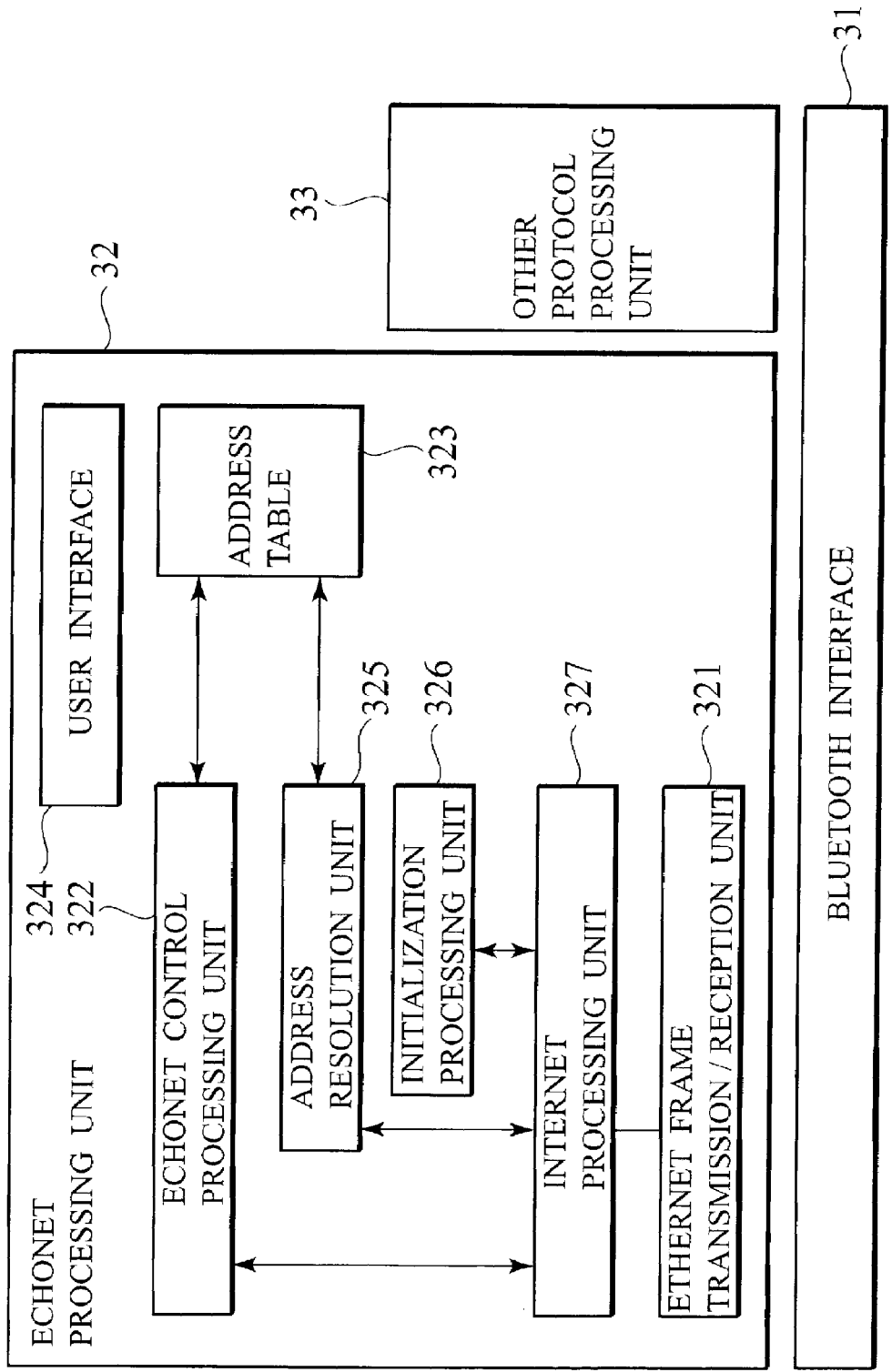
FIG. 2 is a block diagram showing an exemplary configuration of an Echonet device according to the first embodiment of the present invention.

FIG. 2 shows an exemplary internal configuration of the Echonet device 3.

As shown in FIG. 2, the Echonet device 3 has a Bluetooth interface 31 for carrying out radio communications according to the Bluetooth, an Echonet processing unit 32 for carrying out the Echonet processing, and an other protocol processing unit 33 for carrying out prescribed protocol processing.

The Echonet processing unit 32 has an Ethernet frame transmission/reception unit 321 for carrying out transmission/reception of Ethernet frames with the Bluetooth interface 31, an Internet processing unit 327 for carrying out transmission/reception of Internet packets, an initialization processing unit 326 for carrying out the initialization processing for the Echonet on Bluetooth, an address resolution unit 325 for carrying out the address resolution between the Echonet address and the IP address, an address table 323 for storing correspondences between the IP addresses and the Echonet addresses, an Echonet control processing unit 322 for carrying out the Echonet command processing and middleware processing in general, and a user interface 324 such as a liquid crystal screen, a touch panel, a keyboard, etc.

FIGS. 3A and 3B show an exemplary internal structure of the address table 323 in this embodiment.

As shown in FIG. 3A, the address table 323 stores the correspondences between the IP addresses (link local addresses in this embodiment) of the Echonet nodes existing in that IP subnet (more specifically, its link local space) and (node IDs (node identifiers) of) the Echonet addresses of these nodes.

Also, as shown in FIG. 3B, the Echonet device 3 has a table for storing a group of Echonet addresses already used by the other Echonet devices 3 at a given timing.

Here, the Echonet address is a logical identifier of 8 bits length, which has a specification as defined in the Echonet specification. Note that the Echonet specification also defines a network identifier called net ID, but in this embodiment, it is assumed that the net ID is fixed and a node ID to be assigned individually to the node will be utilized. For this value, there is also a possibility of having different values assigned depending on cases.

Note that, in the example of FIG. 3A, the subscript 0 indicates those corresponding to the Bluetooth base station 1 of FIG. 1, while the subscripts A and B indicate those corresponding to the Echonet devices A and B of FIG. 1, respectively.

Note that, in this embodiment, if the Bluetooth base station (PAN base station) 1 is an Echonet node, its internal configuration is basically the same as that of the Echonet device 3 shown in FIG. 1. However, in such a case, the Ethernet frame transmission/reception unit contains a function for carrying out the routing of Ethernet frames (an Ethernet frame routing unit). This Ethernet frame routing unit carries out the following processing, for example. Namely, it checks whether the received Ethernet frame is destined to this node or not, and transmits that Ethernet frame toward the destination if it is not destined to this node, or transfers that Ethernet frame to a corresponding internal processing unit by referring to the Ethernet type field if it is destined to this node.

Note that, in this case, the Echonet address value of the base station 1 that is an Echonet node may be a fixed value such as 0 or 1, for example. It is possible to realize the simplification of the processing by fixedly assigning a special Echonet address to a node in a position of the Bluetooth master, because such a node plays special roles (for carrying out the Ethernet frame routing, the address resolution, the initialization processing, etc.) as the Echonet node, as in the Bluetooth of this embodiment.

In the following, the Echonet address initialization procedure will be described.

Figure 5:
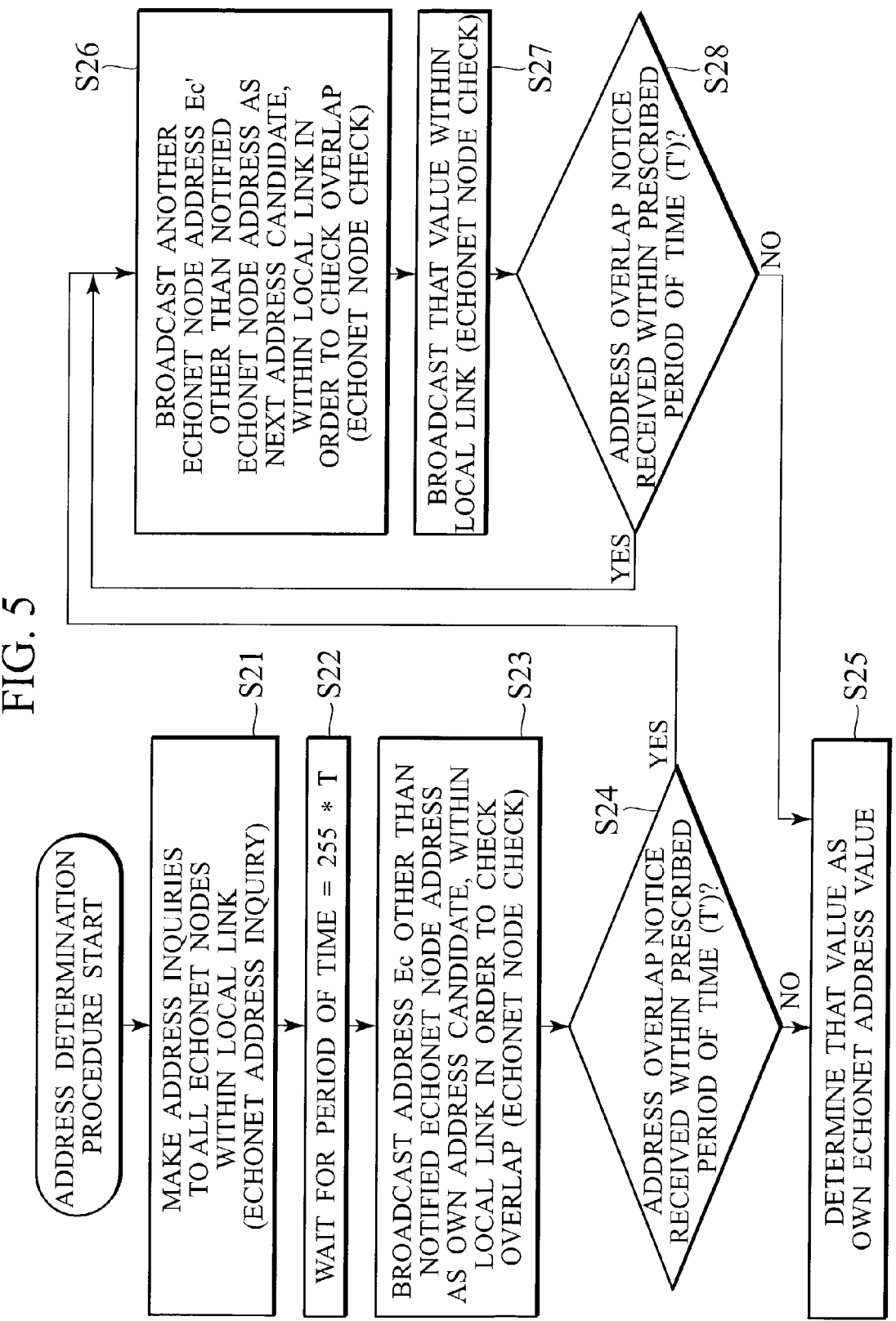
FIG. 5 is a flow chart showing an exemplary processing procedure of an Echonet address determination in the Echonet device of FIG. 2.
Figure 6:
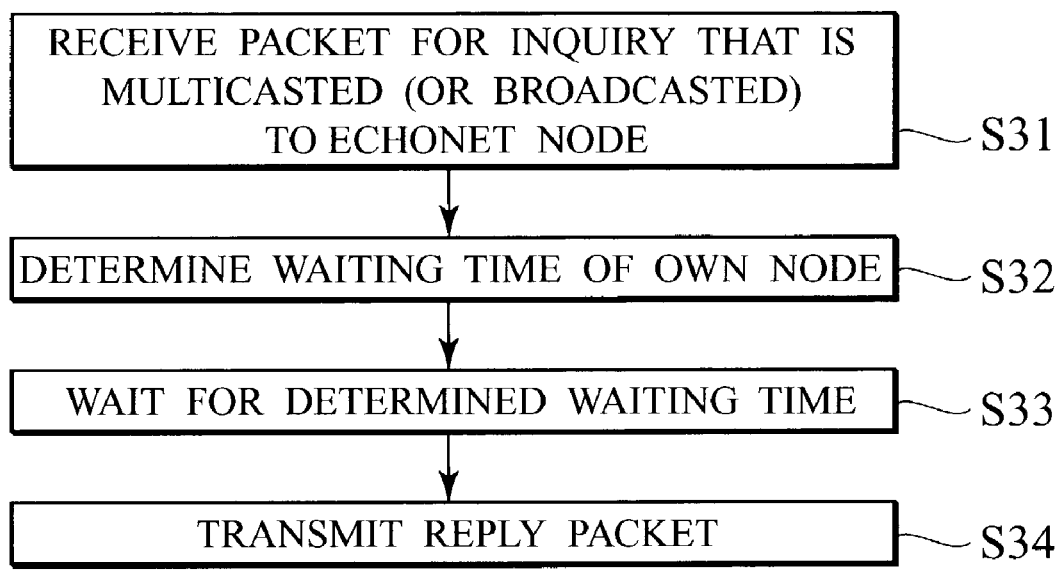
FIG. 6 is a flow chart showing an exemplary processing procedure for receiving a multicasted or broadcasted packet at the Echonet device of FIG. 2.

FIG. 4 shows an exemplary Echonet address initialization sequence. FIG. 5 shows an exemplary Echonet address determination processing procedure at the Echonet device 3. FIG. 6 shows an exemplary processing procedure for the Echonet device 3 at a time of replying to an inquiry from another Echonet device 3.

Here, it is assumed that the Echonet device A and the Echonet device B are originally belonging to a piconet for which the PAN base station 1 is a master. In other words, two Echonet nodes of the Echonet devices A and B are existing at this point in this piconet. Then, it is assumed that the Echonet device C is attempting to join this local net.

In this example, the Echonet device C sends an inquiry to the surrounding (S1), and the PAN base station 1 that is the BT master replies to it (S2). The BT master (PAN base station 1) that received the inquiry carries out the master/slave conversion according to the need, and accommodates the Echonet device C under its control.

Next, the service discovery procedure is carried out between the BT master (PAN base station 1) and the Echonet device C (S3). As a result, the Echonet device C discovers and recognizes that the BT master (PAN base station 1) is a node that is supporting the PAN (TCP/IP) (S4). At this point, the Echonet address of the Echonet device C is not not determined yet.

Next, the PAN initialization procedure is carried out between the BT master (PAN base station 1) and the Echonet device C (S5). As a result, the TCP/IP communications using the PAN on the Bluetooth are realized between these devices. These IP communications may be carried out by either IPv4 or IPv6.

Next, the Echonet device C proceeds to the procedure for determining the own Echonet address.

First, the Echonet device C transmits the Echonet address inquiry packet to the IP multicast address that is assigned in advance so that all the Echonet nodes can receive it, in order to ascertain the addresses of the Echonet nodes within that local net (subnet) (S6, S21). In this way, it is possible to prevent this packet from being transmitted to nodes other than the Echonet nodes. Note that it is also possible to carry out the broadcast (within a prescribed range such as on the local net).

The Echonet devices 3 (the Echonet devices A and B in the example of FIG. 1) that received the Echonet address inquiry packet must notify the own Echonet address value (node ID value in particular). However, in the case where a plurality of Echonet nodes exist within that subnet simultaneously, the Echonet device B may fall into the congested state as packets for notifying addresses are concentrated to the Echonet device C as the replies are made simultaneously. In order to prevent this from happening, each Echonet node that received the Echonet address inquiry packet (S31) waits for a standby time corresponding to a value obtained by multiplying a certain unit period of time T with (the node ID portion of) the own Echonet address (S7, S9, S32 and S33), and then returns a reply packet containing the own Echonet address (S8, S10 and S34). In this way, it becomes possible to prevent the instantaneous concentration of replies to the node that has sent the address inquiry packet.

On the other hand, if the Echonet device C that sent the address inquiry also waits for (a waiting time corresponding to) a value T' obtained by multiplying the above described unit time with the maximum number of nodes that can possibly exist in that local net (which is 255 in the case of the Echonet) (S22), it is possible to expect that replies from all (or almost all) nodes that can possibly exist will be returned. This reception waiting becomes possible because the number of nodes in the Echonet subnet is a limited number of 256 so that the number obtained by multiplying it with the above described unit time can also be confined within a reasonable time. The captured Echonet address is entered into a list of the already used Echonet addresses of FIG. 3B.

Note that the above procedure is applicable not only to the Echonet address inquiry packet and the next Echonet node check packet, but also to the case of receiving another packet that is multicasted or broadcasted and returning a reply packet for it.

Here, there can be cases where the above described Echonet address inquiry packet does not arrive for some reason (such as a bad radio environment, for example), so that it is necessary to account for a possibility of having a node that cannot reply. To this end, as will be described below, in addition to select an address that does not overlap with the Echonet addresses collected by the reply packets for the above described Echonet address inquiry, the operation for checking whether the selected address (node ID) is really not used in that IP subnet or not again will be carried out.

When the Echonet addresses of all (or almost all) the Echonet nodes on that local net are collected in this way, the Echonet device C next determines the candidate for the own Echonet address (S11, S23). In this case, the Echonet device C selects a value other than the values of the Echonet addresses notified until then (the Echonet addresses that can be considered as already existing on that local net) from all the existing (or a prescribed part of) Echonet addresses. In other words, one value other than values already listed in the list of the already used Echonet addresses of FIG. 3B is selected from all the existing (or a prescribed part of) Echonet addresses by a prescribed method (which can be a method for randomly selecting, a method for selecting the smallest value, or a method for selecting the largest value, for example).

The Echonet device C itself determines a candidate for the Echonet address, and an Echonet node check packet containing this value is broadcasted to the local link (or multicasted to an IP multicast address assigned to the Echonet node) to check the overlap of that Echonet address value (S12). After transmitting such a packet, a prescribed waiting time (the above described T', for example) is waited in view of the standby time of the checking target Echonet devices as described above (S13), and if there is no reply during that period of time, it is judged that there is no other node that has the same Echonet address in that subnet, and it is determined to use this address as the Echonet address of that node (S14, S24, S25). Note that it is also possible to modify this such that it is determined to use this address as the Echonet address of that node if there is no reply after repeating the transmission of the check packet and the waiting for a prescribed waiting time for a prescribed number of times (plural times).

In the case where there is another node with the same Echonet address (that is, a packet indicating that "that address is currently in use" is returned), another new value is selected and the overlap of the address is checked similarly (S11 to S14, S25 to S28).

In this embodiment, the above described message indicating that "that Echonet address value is already used by this node" is notified as an Echonet address overlap message.

Note that, instead of waiting for a waiting time corresponding to a value T' obtained by multiplying the maximum number of nodes that can possibly exist (255 in the case of the Echonet) with the above described unit time, it is also possible to use a method in which a waiting time corresponding to a value T" obtained by multiplying the maximum value of (the node ID of) the Echonet address registered at the address table 323 of FIG. 3A with the above described unit time, for example.

When the Echonet address (Ec) is determined in this way, thereafter exchanges of the Echonet packets are carried out between the Echonet nodes by encapsulating the Echonet packet in an IP packet. In this embodiment, the Echonet packet is encapsulated in a UDP packet.

FIG. 7 shows an exemplary format of a packet (Echonet packet or Echonet ARP packet) to be encapsulated in an IP packet. As shown in FIG. 7, besides the general Echonet packet is encapsulated in an IP packet, the other packets such as a control packet in the case of notifying the Echonet address determination and a packet for the address resolution are also contained in this packet format. It is possible to map both the Echonet packet and the control packet related to the Echonet to the same port number (UDP port in this example), and distinguish that packet as either an Echonet packet or a control packet for the Echonet initialization by referring to a packet type field. It is also possible to map the Echonet packet, the Echonet ARP packet, etc., to different port numbers, for example.

Note that, in the above, the Echonet device that received the other multicasted or broadcasted packet (that will becomes an inquiry target or a checking target) (which is also referred to as a receiving side Echonet device) uses a value obtained by multiplying some unit time T with a value of the node ID portion of the own Echonet address as the standby time in the case of returning a reply packet for that received packet, but the method for determining the standby time is not necessarily limited to this and many variations are possible. Many variations are also possible for the method for determining the prescribed waiting time at the Echonet device that transmitted the other multicasted or broadcasted packet (which will become an inquiry target or a checking target) (which will also be referred to as a transmitting side Echonet device), in correspondence to the method for determining the standby time. In the following, some exemplary variations will be described.

(1) At the receiving side Echonet device, instead of using the node ID portion of the own Echonet address directly, it is possible to use a predetermined value that is in one-to-one correspondence with the value of the node ID portion of the own Echonet address (such as one of the values that can possibly be taken by the node ID of the Echonet address), for example.

At the transmitting side Echonet device, rather than using a value obtained by multiplying the maximum value of the node ID with the unit time as the waiting time, it is possible to use a value obtained by multiplying the maximum value of the corresponding value in the case of applying the above described correspondence to the node IDs of the Echonet addresses registered in the address table 323 of FIG. 3A with the unit time as the waiting time, for example.

(2) At the receiving side Echonet device, in stead of using the node ID portion of the own Echonet address directly, it is possible to use a value obtained by entering the value of the node ID portion of the own Echonet address into the following function, for example. This function maps the values of the node ID portion of the Echonet address into a range of values smaller than the maximum value of the node ID of the Echonet address. For example, it can be a function that outputs the quotient obtained by dividing the node ID by a constant n. It can also be a function that outputs a residue obtained by dividing the node ID by a constant n, for example. This mapping may not distributes the outputs uniformly.

At the transmitting side Echonet device, rather than using a value obtained by multiplying the maximum value of the node ID with the unit time as the waiting time, it is possible to use a value obtained by multiplying the maximum value of the mapping range with the unit time, for example. It is also possible to use a value obtained by multiplying the maximum value of the mapped values in the case of applying the above described function to the node IDs of the Echonet addresses registered in the address table 323 of FIG. 3A with the unit time as the waiting time, for example.

(3) At the receiving side Echonet device, in stead of using the node ID portion of the own Echonet address directly, it is possible to use a random value generated by the random numbers which have a distribution function with a peak at the value of the node ID portion of the own Echonet address, for example.

At the transmitting side Echonet device, rather than using a value obtained by multiplying the maximum value of the node ID with the unit time as the waiting time, it is possible to use a value obtained by multiplying the maximum value of the random values in the case of applying the above described random numbers to the node IDs of the Echonet addresses registered in the address table 323 of FIG. 3A with the unit time as the waiting time, for example.

(4) At the receiving side Echonet device, in stead of obtaining the standby time by multiplying a value of the node ID portion of the own Echonet address (or a value obtained by any of the above described methods) with the unit time, it is possible to use a value obtained by entering the value of the node ID portion of the own Echonet address (or a value obtained by any of the above described methods) into a prescribed function (except for a function that multiplies the unit time), for example.

At the transmitting side Echonet device, it is possible to use a value obtained by entering the maximum value of the node ID into the above described prescribed function as the waiting time, for example. It is also possible to use a value obtained by entering the node ID of the Echonet address registered in the address table 323 of FIG. 3A into the above described prescribed function as the waiting time, for example.

Note that, in the above, one type of the standby time at the receiving side Echonet device and one type of the waiting time at the transmitting side Echonet device are determined in advance, but instead of that, it is also possible to implement a plurality of sets of the standby time determination method and the waiting time determination method in advance (or implement the method of the above (2) using n as a parameter, for example), describe information for specifying which method is to be used (or which value is to be used as n of the above (2), for example) in the packet when the transmitting side Echonet device broadcasts or multicasts the inquiry packet or the check packet to the receiving side Echonet device, determine the standby time by the specified method at the receiving side Echonet device, and determine the waiting time by the same method at the transmitting side Echonet device.

For example, in the case where the sets of the standby time determination method and the waiting time determination method are such that ways of distributing the standby time at the receiving side Echonet device (and consequently the level of concentration of the replies at the transmitting side Echonet device) is different from each other, the transmitting side Echonet device can appropriately select the method in which the standby times of a plurality of the receiving side Echonet devices are concentrated in a short period or the method in which the standby times of a plurality of the receiving side Echonet devices are distributed over a longer period, depending on the size of the memory capacity of th own device.

Note that, in the above described method in which a value obtained by multiplying the value of the node ID portion of the Echonet address of the receiving side Echonet device with the unit time is used as the standby time, it is also possible for the transmitting side Echonet device to specify the unit time as a parameter.

Note also that, in the above, the link local address is used as the IP address of the Echonet address, but it is also possible to use the globally unique IP address or the private IP address (which may be the IPv4 address or the IPv6 address).

Figure 8:
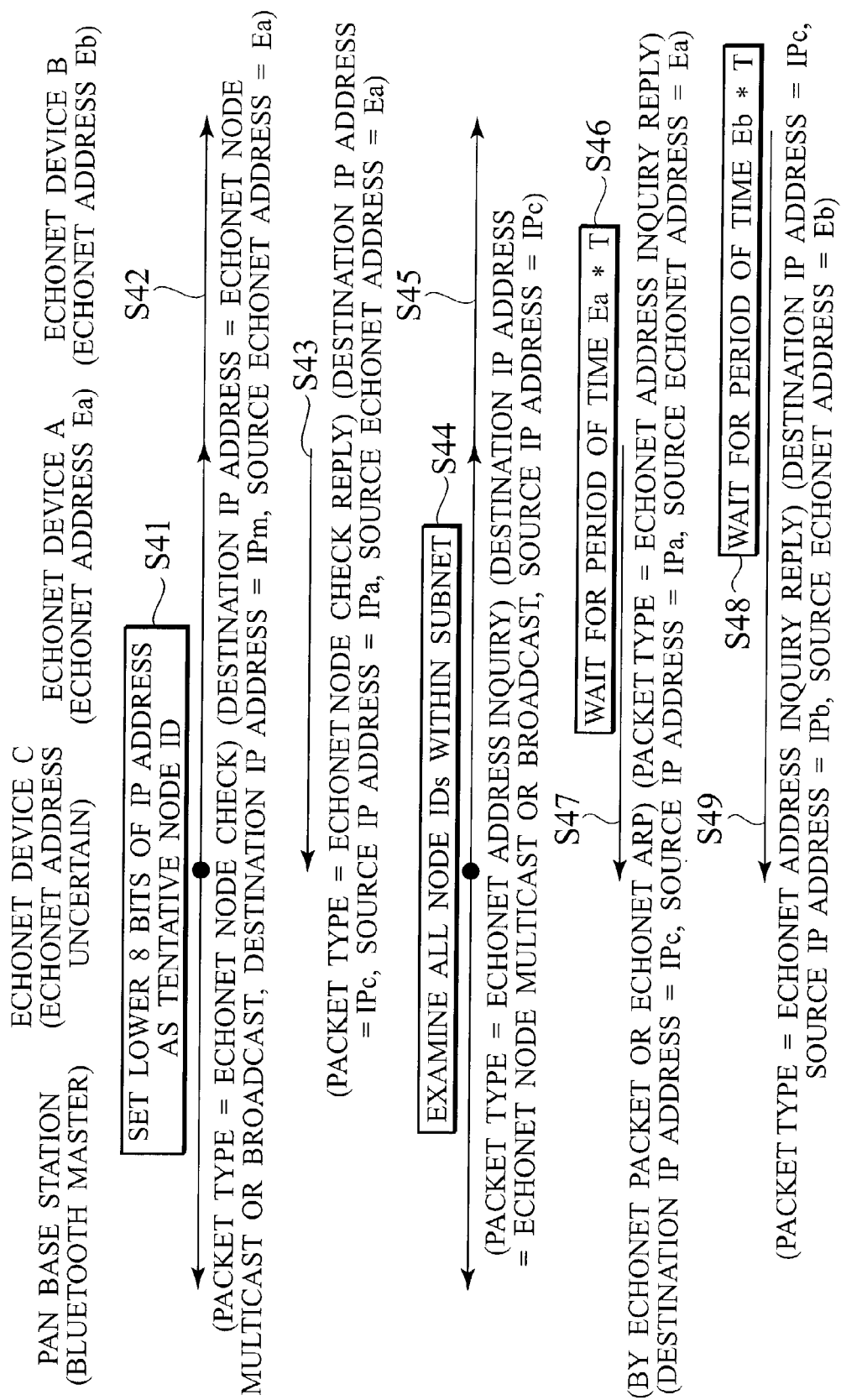
FIG. 8 is a sequence chart showing one part of an exemplary Echonet address initialization sequence according to the second embodiment of the present invention.
Figure 9:
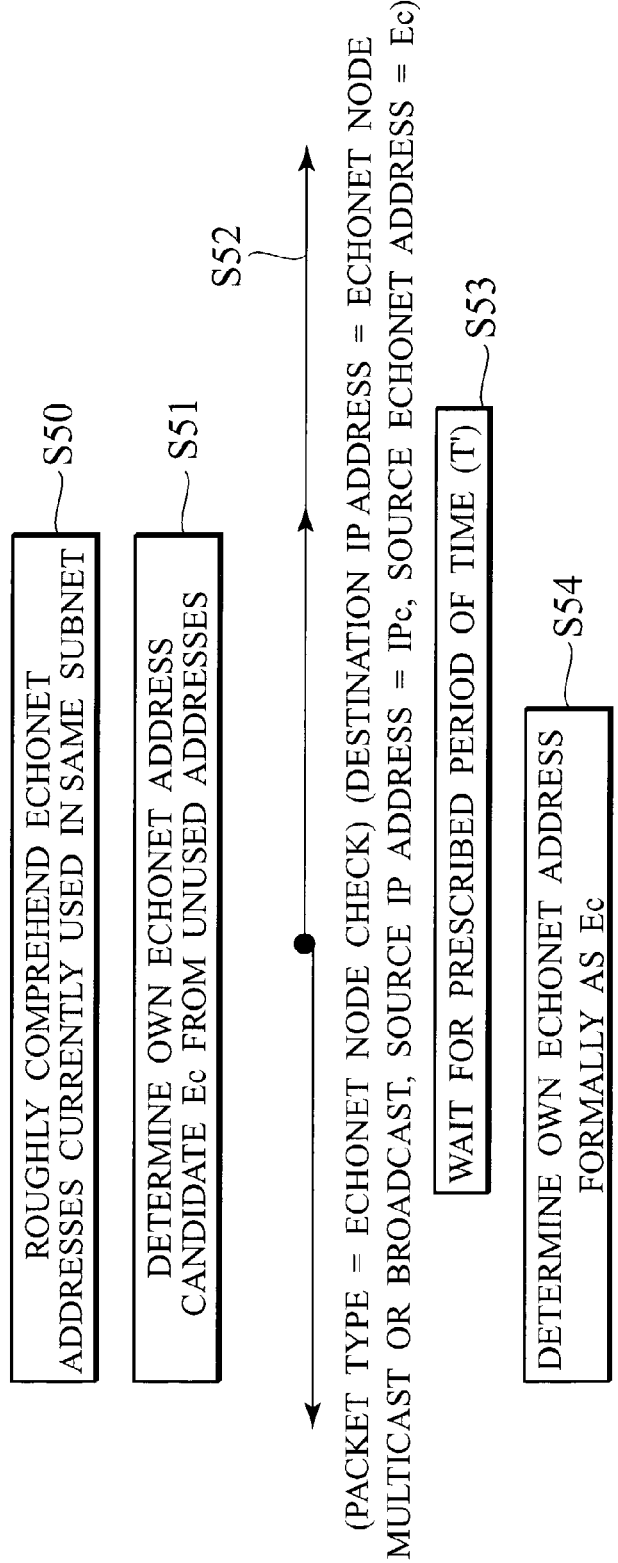
FIG. 9 is a sequence chart showing another part of an exemplary Echonet address initialization sequence according to the second embodiment of the present invention.

Referring now to FIG. 8 and FIG. 9, the second embodiment of a communication device and a communication control method according to the present invention will be described in detail.

In the following, the differences from the first embodiment will be mainly described. For this embodiment, see FIG. 1 for the exemplary configuration of the home network system, FIG. 2 for the exemplary internal configuration of the Echonet device 3, FIGS. 3A and 3B for the exemplary internal structure of the address table, and FIG. 7 for an exemplary format of a packet to be encapsulated in an IP packet.

In the case where a part (the lower 8 bits value, for example) of the IP address is basically used as the Echonet address (node ID), if there exists a node that has the same node ID in the same subnet and if this value is used, the overlap of the value of the Echonet address (node ID) would occur in the subnet. For this reason, in this embodiment, the own Echonet address (node ID) is determined by utilizing the method described above in such a case.

FIG. 8 and FIG. 9 show an exemplary Echonet address initialization sequence in this case (FIG. 8 and FIG. 9 show one sequence in two parts).

Here, it is assumed to use the same concrete example as that of FIG. 4 to FIG. 6. Namely, it is assumed that the Echonet device A and the Echonet device B are originally belonging to a piconet for which the PAN base station 1 is a master. In other words, two Echonet nodes of the Echonet devices A and B are existing at this point in this piconet. Then, it is assumed that the Echonet device C is attempting to join this local net.

Here, the Echonet device C determines a value of the lower 8 bits of the IP address assigned to it as the candidate for the own Echonet address (node ID) (S41).

Note that, if it is the class C address of the IPv4 address, there is no overlap at this point. In the case of the other IP addresses, there can be cases where the lower 8 bits of the IP address assigned to the other node in the same subnet are the same, so that there is a possibility for the overlap of the node ID to occur. For this reason, in order to check this possibility, the procedure of FIG. 5 is started by using the Echonet node check packet similar to that of the step S12 of FIG. 4.

Namely, at the Echonet device C, an Echonet node check packet containing the value of the lower 8 bits of the IP address described above is broadcasted to the local link (or multicasted to an IP multicast address assigned to the Echonet node) to check the overlap of that Echonet address value (S42).

If no reply packet indicating that the same Echonet address (node ID) as the inquired value is used is not returned, it is judged that there is no overlap, and this value (the value of the lower 8 bits of the IP address) is determined as the Echonet address (node ID) to be used by the own device.

On the other hand, if it is using the same Echonet address (node ID) as the inquired value, the Echonet device that received that packet transmits a reply packet indicating that fact to the Echonet device C (S43).

For example, in the case where the above described lower 8 bits value of the IP address is the same as the Echonet address (node ID)=Ea used by the Echonet device A, the Echonet device A that received this value transmits a reply packet indicating that it is using the same Echonet address (node ID) as the inquired value.

When it is judged that the inquired candidate for the Echonet address (node ID) is used by the other Echonet device according to this reply packet, the Echonet device C proceeds to the check of all the node IDs in the subnet (S44).

The subsequent processing is basically the same as that of FIG. 4 to FIG. 6.

Namely, the Echonet device C multicasts or broadcasts the Echonet address inquiry packet in order to ascertain the addresses of the Echonet nodes within that local net (subnet) (S45).

The Echonet devices A and B that received this Echonet address inquiry packet notify the own Echonet addresses (node IDs) (S47, S49) to the Echonet device C that transmitted this packet, after waiting for the prescribed standby times as described above (S46, S48).

The Echonet device C carries out the receiving of the reply packets during the prescribed waiting time as described above.

In this way, the Echonet device C comprehends all (or roughly) the Echonet addresses currently used in the subnet (S50).

Next, similarly as described above (by accounting for a possibility of having a node that cannot reply to the Echonet address inquiry packet), in addition to select an address that does not overlap with the Echonet addresses collected by the reply packets for the Echonet address inquiry, the operation for checking whether the selected address (node ID) is really not used in that IP subnet or not again will be carried out.

Namely, first, the candidate for the own Echonet address is determined such that there is no overlap with the other Echonet devices (S51).

The Echonet device C multicasts or broadcasts the Echonet node check packet containing a value of the candidate for the own Echonet address, to check the overlap of that Echonet address candidate value (S52).

The Echonet devices A and B that received this Echonet node check packet carries out the returning of a reply packet indicating that it is using the same Echonet address (node ID) to the Echonet device C that transmitted this packet, after waiting for the prescribed standby times as described above in the case of returning it.

The Echonet device C waits for a prescribed waiting time as described above (S53), and if there is no reply during that period of time, it is judged that there is no other node that has the same Echonet address in that subnet, and it is determined to use that Echonet address candidate as the own Echonet address (S54). Note that it is also possible to modify this such that it is determined to use this address as the Echonet address of that node if there is no reply after repeating the transmission of the check packet and the waiting for a prescribed waiting time for a prescribed number of times (plural times).

In the case where there is another node with the same Echonet address (that is, a packet indicating that "that address is currently in use" is returned), another new value is selected and the overlap of the address is checked similarly (S52 to S54).

Referring now to FIGS. 10A and 10B to FIG. 13, the third embodiment of a communication device and a communication control method according to the present invention will be described in detail.

In the following, the differences from the first and second embodiments will be mainly described. For this embodiment, see FIG. 1 for the exemplary configuration of the home network system and FIG. 2 for the exemplary internal configuration of the Echonet device 3.

The second embodiment is directed to the exemplary case of determining the Echonet address (node ID) of the own node by utilizing a part (a value of the lower 8 bits, for example) of the IP address. In contrast, the third embodiment is directed to the exemplary case of determining the Echonet address (node ID) of the own node by utilizing a part (a value of the lower 8 bits, for example) of the Bluetooth address. The Bluetooth address is an invariable address so that this method is more suitable to the demand of the Echonet that the same Echonet address should preferably be assigned to the same node as much as possible, for example.

Here, a value of the previously utilized node ID is first utilized as a candidate for the own node ID. Also, before the node itself determines the address, whether an address server (a DHCP server of the Echonet version) for carrying out the assignment of the Echonet address exists on the network or not is checked.

Each one of the Bluetooth base station (PAN base station) and the Echonet devices (the base station 1 and the devices A, B and C in FIG. 1) has a Bluetooth address and an IP address.

The Bluetooth address is an unchangeable hardware address that is assigned to the Bluetooth interface in advance, for which the 48 bits IEEE 802 address is usually assigned.

The IP address can be either an IPv4 address or an IPv6 address. Note that, in this embodiment, in the case of IPv4, the IP address is assumed to be a class C address, but it may be a class A or class B IPv4 address. Also, in the case of IPv6, the IP address can be a link local IPv6 address, for example. As described above, the link local address is a special IP address, which can be used only on that link (which is the Bluetooth in this embodiment). This is a scheme that is used in the case where there is no need to give a globally unique IP address, but a specific application of the IP is to be operated on a local network (link network).

The Echonet protocol is a protocol developed by presupposing the local network as its target so that it is preferable to use the link local address even on the IP, while the use of the link local address makes it possible to prevent erroneous accesses or malicious accesses to the Echonet operating range and the home appliances from outside of the home.

FIGS. 10A and 10B show an exemplary internal structure of the address table 323 in this embodiment.

As shown in FIG. 10A, the address table 323 of this embodiment stores the correspondences between the IP addresses of the Echonet nodes existing in that IP subnet (more specifically, its link local space), the hardware addresses (more specifically, the Bluetooth addresses) of these nodes, and (node IDs (node identifiers) of) the Echonet addresses of these nodes.

Also, as shown in FIG. 10B, the Echonet device 3 has a table for storing a group of Echonet addresses already used by the other Echonet devices 3 at a given timing.

Note that, instead of using the table of FIG. 10A, it is also possible to use two tables including a table of correspondence between the hardware addresses and the IP addresses and a table of correspondence between the IP addresses and the Echonet addresses, for example (it is also possible to use two tables including a table of correspondence between the hardware addresses and the Echonet addresses and a table of correspondence between the the Echonet addresses and the IP addresses, or two tables including a table of correspondence between the Echonet addresses and the hardware addresses and a table of correspondence between the the hardware addresses and the IP addresses).

In the following, the Echonet address initialization procedure will be described.

Figure 11:
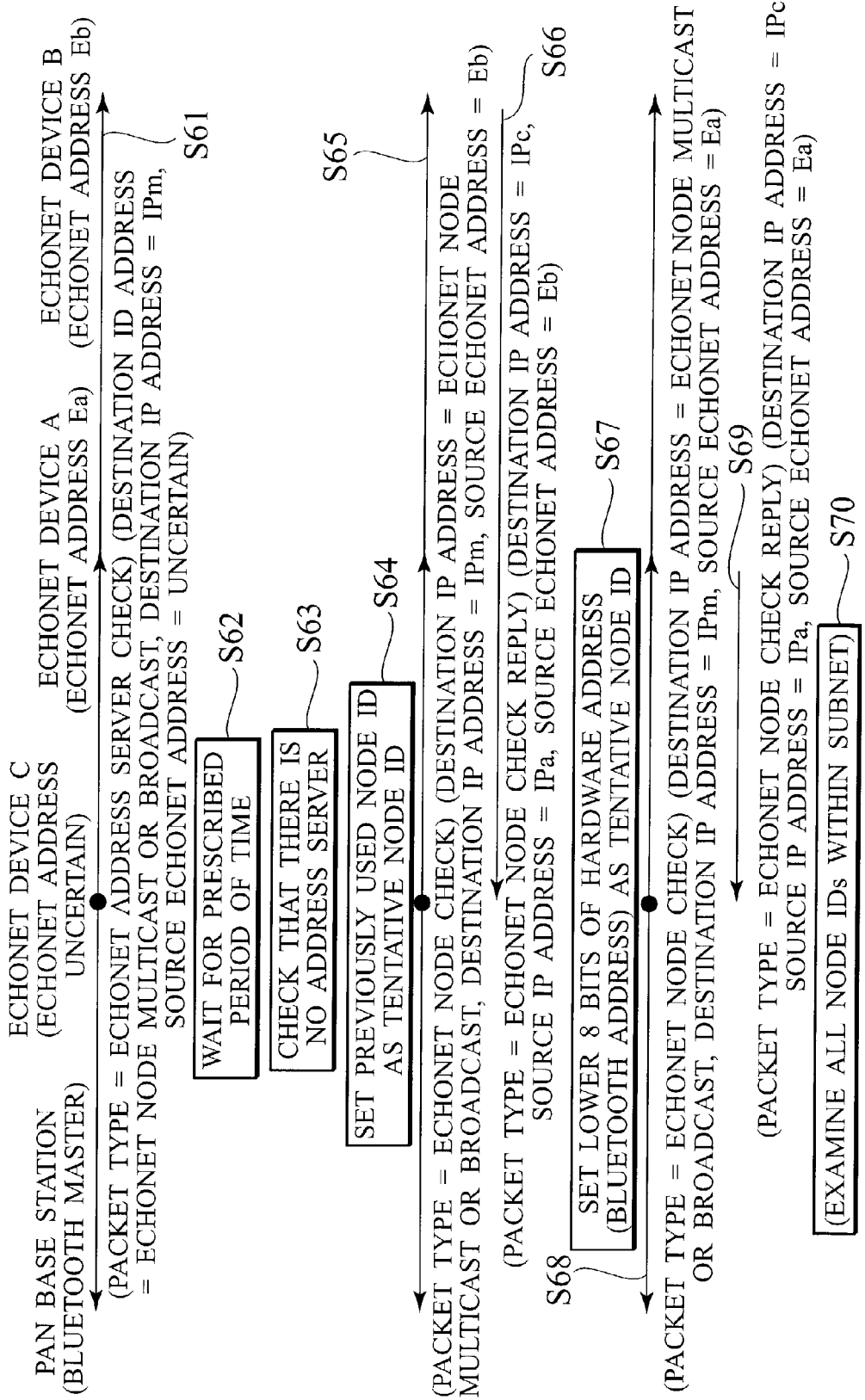
FIG. 11 is a sequence chart showing one part of an exemplary Echonet address initialization sequence according to the third embodiment of the present invention.
Figure 12:
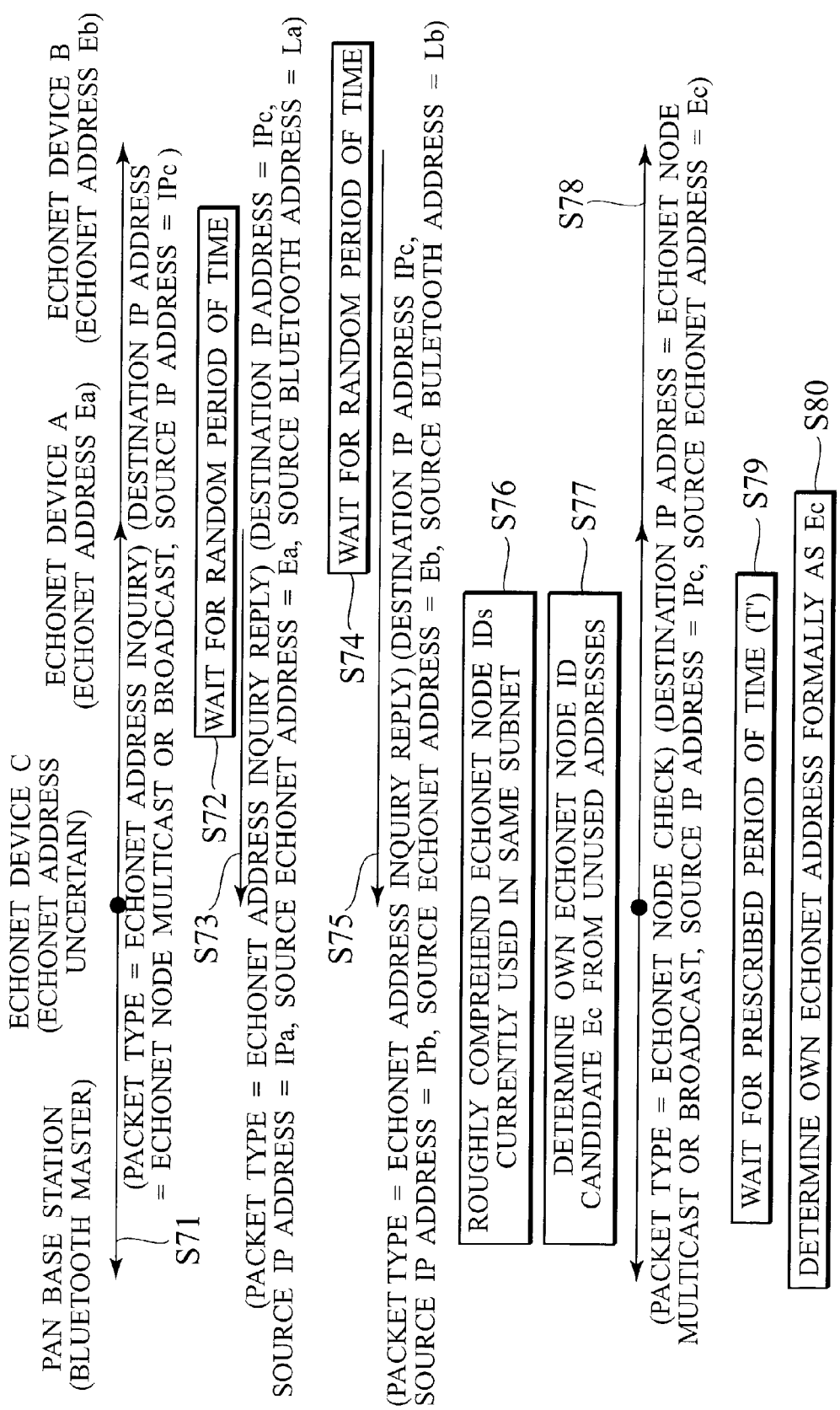
FIG. 12 is a sequence chart showing another part of an exemplary Echonet address initialization sequence according to the third embodiment of the present invention.

FIG. 11 and FIG. 12 show an exemplary Echonet address initialization sequence (FIG. 11 and FIG. 12 show one sequence in two parts).

Here, it is also assumed that the Echonet device A and the Echonet device B are originally belonging to a piconet for which the PAN base station 1 is a master. In other words, two Echonet nodes of the Echonet devices A and B are existing at this point in this piconet. Then, it is assumed that the Echonet device C is attempting to join this local net.

Note that, in the exemplary sequence of FIG. 11 and FIG. 12, the procedure necessary for the initialization of the Bluetooth communications (the inquiry, the service discovery protocol, etc.) and the procedure necessary for the initialization of the TCP/IP communications (the IP address acquisition, etc.) are assumed to be already finished so that only the procedure necessary after that is shown (see S1 to S5 of FIG. 4).

Next, the Echonet device C proceeds to the procedure for determining the own Echonet address.

First, the Echonet device C broadcasts (or multicasts only with respect to the Echonet nodes) an Echonet address server check packet within that IP subnet, to check whether the Echonet address server (not shown) for carrying out the assignment of the Echonet address (node ID) exists or not (S61).

Here, the Echonet address server is a server that internally has the address table such as that of FIG. 10A, for example, and carries out the assignment of the Echonet address (node ID) value according to the request.

When the Echonet address server exists within that IP subnet, it suffices to have the Echonet address assigned by this server, so that the subsequent procedure becomes unnecessary. In this case, the Echonet address assignment procedure using the Echonet address server is assumed to be similar to the method defined for various physical media (the electric power line, LON, etc.) by the Echonet specification or the method defined by the TCP/IP specification (the method using the DHCP server, for example).

Here, the case where the address server exists will be described. Some Echonet devices (such as the Echonet devices defined on the electric power line, the infrared, or the twist pair line, for example) have been made on the presumption that the Echonet address value (node ID value) does not change in any cases (or almost any cases).

This is because the address server always exists on each network (the electric power line network, the infrared network, the twist pair line network, etc.) and this address server is always operating and having a mechanism for storing which node ID value is assigned to which node. As a consequence, when the same node is activated on the same network, even if it is not the first activation but the second or subsequent activation, the address server stores in advance a set of the identifier of that node (the hardware address, the datalink layer address or the unique identifier, for example) and the Echonet address (node ID), and always assigned the same node ID value. The nodes connected to such a network may have a possibility of adopting an interpretation that "The Echonet address (node ID) value of the Echonet device does not change".

In contrast, the address assignment scheme of this embodiment is a scheme in which "a value of the node ID may possibly change". Here, the device connected to the above described existing network may not possibly be capable of handling this scheme. For example, there can be cases where the device connected to the above described existing network interprets that a value of the node ID of the Echonet device on this IP network as unchanged over a long period of time.

For this reason, in the case where the device connected to the existing network is to be connected, that is, the "IP network" of this embodiment and the existing network are connected to form the Echonet, the address server is always provided at the Echonet router which is a "node for connecting the IP network and the existing network" such that it becomes possible to guarantee that the Echonet address (node ID) of the Echonet device to be arranged on this IP network is unchanged, because the values of the node IDs distributed by the address server are basically unchanged. Here, the address server to be provided on the Echonet router is also assumed to be producing and storing a table of correspondence between the datalink layer addresses (the Bluetooth addresses in this embodiment) and the node IDs.

This completes the description of the case where the address server exists.

Next, the case where the Echonet address server does not exist in that IP subnet will be described.

Namely, when there is no reply from the Echonet address server during a prescribed period of time (S62), the Echonet device C that transmitted the Echonet address server check packet judges that the Echonet address server does not exist (S63).

When it is judged that the Echonet address server does not exist, the Echonet address is to be determined independently by the Echonet device C. In such a case, if a device with the same Echonet address value already exists within that IP subnet (Echonet subnet), there is a need to avoid using that value. This is because if the address overlap occurs, the identification of the node by using the Echonet address would become impossible.

First, a value to be used by the Echonet device C as a candidate for the Echonet address of the own node is set to be a value of the node ID utilized at a time of activating the own node as the Echonet device on the network previously (S64). Here, this value is assumed to be Eb.

Note that, in this case, the moving of the Echonet device is possible so that the check of this value (S65, S66) may be carried out only when the subnet ID value coincides. This is because when the subnet ID value differs from the previous value, it is possible to regard that this device has moved over the subnets so that the "previously used node ID value" becomes meaningless (in this case, the operation may proceed to S67 by skipping S65 and S66).

The Echonet device C notifies this value to the entire subnet by using the Echonet node check packet, in order to check whether a node that is already using this value exists or not (or when the subnet ID value coincides, this value is notified to the entire subnet in order to check whether a node that is already using this value exists or not). To this end, a packet of the type "Echonet node check" is broadcasted (or multicasted only with respect to the Echonet nodes) within the subnet (S65).

When there is no reply packet for notifying the address overlap arrives during a prescribed period of time, the Echonet device C that transmitted the Echonet node check packet judges that a node that is using this node ID does not exist within that subnet, and determines to use that node ID formally as (the node ID of) the Echonet address. In that case, a packet for notifying the start of the utilization of that address and the attribute of the own device may be transmitted within the subnet as a trigger for that purpose.

Note that it is also possible to modify this such that it is determined to use this address as the Echonet address of that node if there is no reply after repeating the transmission of the check packet and the waiting for a prescribed waiting time for a prescribed number of times (plural times).

In this example, the Echonet device B is already using the same value (Eb), so that a packet (the Echonet node check reply) for notifying this fact is transferred (S66), and this value cannot be used.

When the previously used node ID value is already in use, the Echonet device C sets a part, such as a value of the lower 8 bits, for example, of the hardware address (the Bluetooth address in this embodiment) of the own node as a candidate for the node ID value of the own node next (S67). By using a part of the hardware address of the own node, it becomes possible to suppress the possibility for the variation of the node ID value.

Here, similarly, the Echonet device C notifies this value to the entire subnet by using the Echonet node check packet, in order to check whether a node that is already using this value exists or not (S68). When there is no reply packet for notifying the address overlap arrives during a prescribed period of time, it is judged that a node that is using this node ID does not exist within that subnet, and this node ID is used formally as (the node ID of) the Echonet address.

Note that it is also possible to modify this such that it is determined to use this address as the Echonet address of that node if there is no reply after repeating the transmission of the check packet and the waiting for a prescribed waiting time for a prescribed number of times (plural times).

In this example, the Echonet device A is already using the same value (Ea), so that a packet (the Echonet node check reply) for notifying this fact is transferred (S69), and this value cannot be used.

When both "a value of the node ID previously used by the own node" and "a value of a part (the lower 8 bits, for example) of the hardware address of the own node" are not usable, the Echonet device C proceeds to the check of all the node IDs within the subnet.

The subsequent processing is basically similar to the case of FIG. 4 to FIG. 6 (or that of S45 to S54 of FIG. 8 and FIG. 9).

Namely, the Echonet device C transmits the Echonet address inquiry packet to the IP multicast address or the broadcast address that is assigned in advance such that all the Echonet nodes will receive it, in order to ascertain the addresses of the Echonet nodes within that local net (subnet) (S71).

The Echonet devices A and B that received this Echonet address inquiry packet (S71) notify the own Echonet addresses (node IDs) (S73, S75) to the Echonet device C that transmitted this packet, after waiting for the prescribed standby times as described above (S72, S74).

The Echonet device C that transmitted the address inquiry carries out the receiving of the reply packets during the prescribed waiting time as described above, in order to comprehend all (or roughly) the Echonet addresses currently used in the subnet (S76). The captured Echonet address is entered into a list of the already used Echonet addresses of FIG. 10B.

Here, there can be cases where the above described Echonet address inquiry packet does not arrive for some reason (such as a bad radio environment, for example), so that it is necessary to account for a possibility of having a node that cannot reply. To this end, as will be described below, in addition to select an address that does not overlap with the Echonet addresses collected by the reply packets for the above described Echonet address inquiry, the operation for checking whether the selected address (node ID) is really not used in that IP subnet or not again will be carried out.

When the Echonet addresses of all (or almost all) the Echonet nodes on that local net are collected in this way, the Echonet device C next determines the candidate for the own Echonet address. In this case, the Echonet device C selects a value other than the values of the Echonet addresses notified until then (the Echonet addresses that can be considered as already existing on that local net) from all the existing (or a prescribed part of) Echonet addresses (S77). In other words, one value other than values already listed in the list of the already used Echonet addresses of FIG. 10B is selected from all the existing (or a prescribed part of) Echonet addresses by a prescribed method (which can be a method for randomly selecting, a method for selecting the smallest value, or a method for selecting the largest value, for example).

The Echonet device C itself determines a candidate for the Echonet address, and an Echonet node check packet containing this value is broadcasted to the local link (or multicasted to an IP multicast address assigned to the Echonet node) to check the overlap of that Echonet address value (S78).

The Echonet devices A and B that received this Echonet node check packet carries out the returning of a reply packet indicating that it is using the same Echonet address (node ID) to the Echonet device C that transmitted this packet, after waiting for the prescribed standby times as described above in the case of returning it.

The Echonet device C waits for a prescribed waiting time as described above (S79), and if there is no reply during that period of time, it is judged that there is no other node that has the same Echonet address in that subnet, and it is determined to use that address as the Echonet address of that node (S80). Note that it is also possible to modify this such that it is determined to use this address as the Echonet address of that node if there is no reply after repeating the transmission of the check packet and the waiting for a prescribed waiting time for a prescribed number of times (plural times).

In the case where there is another node with the same Echonet address (that is, a packet indicating that "that address is currently in use" is returned), another new value is selected and the overlap of the address is checked similarly (S77 to S79).

In this embodiment, the above described message indicating that "that Echonet address value is already used by this node" is notified as an Echonet address overlap message.

Note that, in the above, among the three types of procedures including the procedure in which "whether the address server exists or not is checked, and if it exists, the address is assigned by requesting it to that address server" (S61 to S63), the procedure in which "the previously used node ID value is utilized as a candidate for the own node ID) (S64 to S66), and the procedure in which "a value of a part of the hardware address of the own node is utilized as a candidate for the own node ID) (S67 to S69), it is also possible to use a configuration which omits any one or two.

When the Echonet address (Ec) is determined in this way, thereafter exchanges of the Echonet packets are carried out between the Echonet nodes by encapsulating the Echonet packet in an IP packet.

FIG. 13 shows an exemplary format of a packet (Echonet packet or Echonet ARP packet) to be encapsulated in an IP packet. As shown in FIG. 13, besides the general Echonet packet is encapsulated in an IP packet, the other packets such as a control packet in the case of notifying the Echonet address determination and a packet for the address resolution are also contained in this packet format. It is possible to map both the Echonet packet and the control packet related to the Echonet to the same port number (UDP port in this example), and distinguish that packet as either an Echonet packet or a control packet for the Echonet initialization by referring to a packet type field. It is also possible to map the Echonet packet, the Echonet ARP packet, etc., to different port numbers, for example.

Referring now to FIG. 14 to FIG. 17, the fourth embodiment of a communication device and a communication control method according to the present invention will be described in detail.

In the following, the differences from the first, second and third embodiments will be mainly described. For this embodiment, see FIG. 1 for the exemplary configuration of the home network system, FIG. 2 for the exemplary internal configuration of the Echonet device 3, and FIGS. 10A and 10B for the exemplary internal structure of the address table. Also, see FIG. 13 for the exemplary format of a packet to be encapsulated in an IP packet (except that the contents of the packet type are different and include an Echonet address initialization, an Echonet address server reply, an Echonet address reply, a net ID acquisition request, a net ID reply and an Echonet address notice). Note that the waiting time of the Echonet device that transmitted a packet that requires a reply from the correspondent and the standby time of the Echonet device that receives such a packet and returns a reply for it are also the same as described above.

Here, it is assumed that the Echonet device S (not shown) that is the Echonet address server is (or can possibly be) existing.

A node that wishes to acquire the Echonet address (which is assumed to be the Echonet device C in this embodiment) broadcasts to all the Echonet nodes within the subnet a packet that has triple roles of "a broadcast packet for searching out the Echonet address server", "a broadcast packet for checking whether a value of the node ID (a value of the Echonet address) tentatively determined by the own node can be used as it is (whether there is any other node that is using the same value of the node ID (Echonet address) within the subnet or not", and "a broadcast packet to be transmitted in order to urge the transmission of information regarding that node (the Echonet address and the node ID, the IP address, the Bluetooth address (the link layer address such as the 802 address or the EUI64 address), with respect to the other nodes existing within the subnet".

It suffices for this broadcast to reach only to the Echonet nodes, so that it is transmitted to the IP multicast address for which only the Echonet nodes are subscribed or to the IP broadcast address. This packet will be referred to as an "Echonet address initialization packet".

In the following, the Echonet address initialization procedure will be described.

Figure 14:
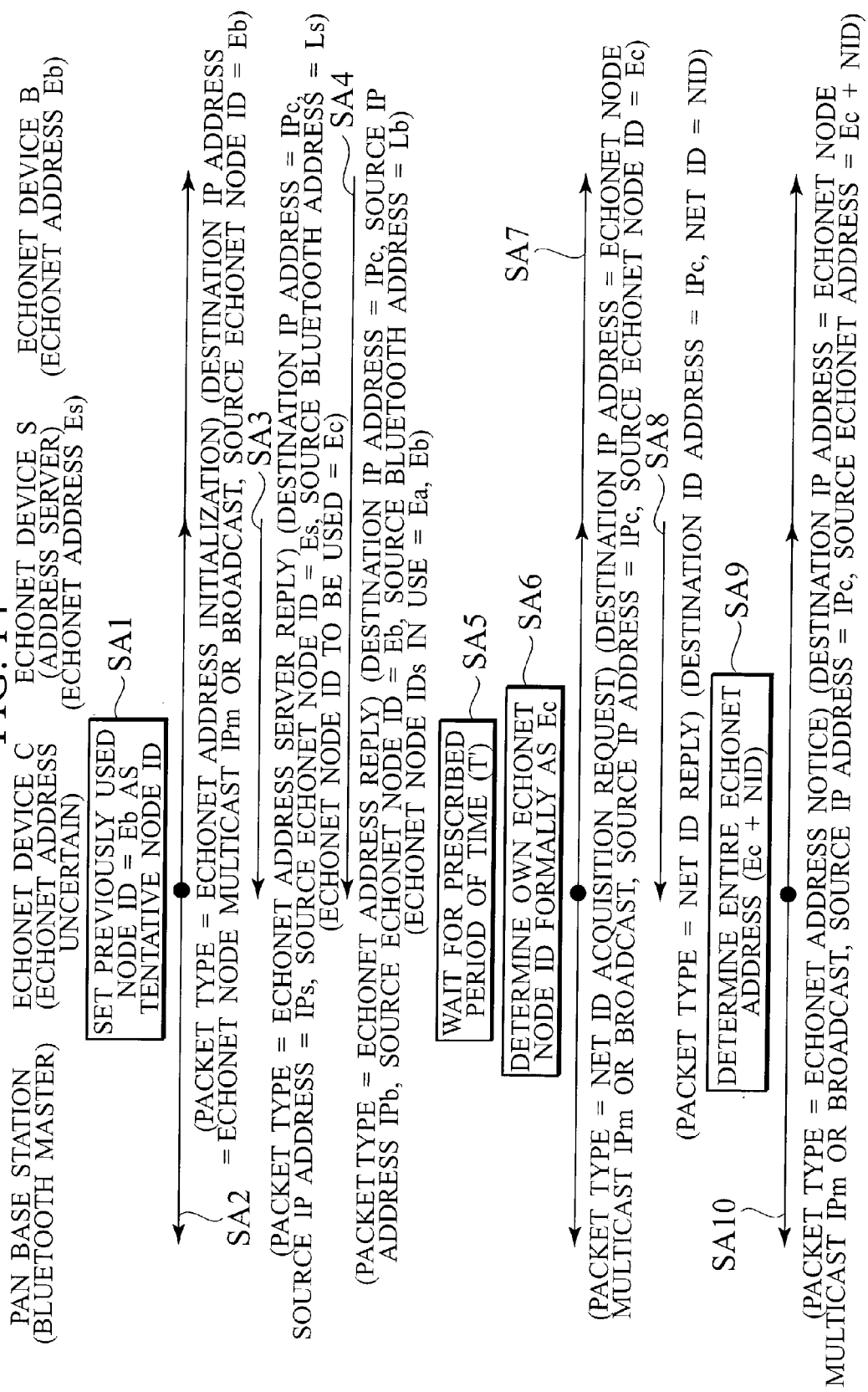
FIG. 14 is a sequence chart showing one exemplary Echonet address initialization sequence according to the fourth embodiment of the present invention.

FIG. 14 shows an exemplary Echonet address initialization sequence for the case in which values of the Echonet addresses (node IDs) within the subnet are managed in a form of the centralized control, and when a value of the Echonet node ID is requested, an Echonet address server having a function for assigning this value exists.

Here, it is assumed that the Echonet device S has a function of the Echonet address server. Also, the Bluetooth address, the IP address, and the Echonet address (node ID) of the Echonet device S that is the Echonet address server are assumed to be "Ls", "IPs", and "Es" respectively.

Also, it is also assumed that the Echonet device S that is the Echonet address server and the Echonet device B are already existing in a piconet for which the PAN base station 1 is a master (of course the other Echonet devices such as the Echonet device A may also exist, but they are represented by the Echonet device B in this embodiment). Then, it is assumed that the Echonet device C is attempting to join this local net.

Note that, in the exemplary sequence of FIG. 14, the procedure necessary for the initialization of the Bluetooth communications (the inquiry, the service discovery protocol, etc.) is assumed to be already finished so that only the procedure necessary after that is shown (see S1 to S5 of FIG. 4).

Now, the Echonet device C proceeds to the procedure for determining the own Echonet address.

First, the Echonet device C that wishes to determine the Echonet address determines a tentative node ID which is a candidate for the own node ID (SA1).

Figure 15:
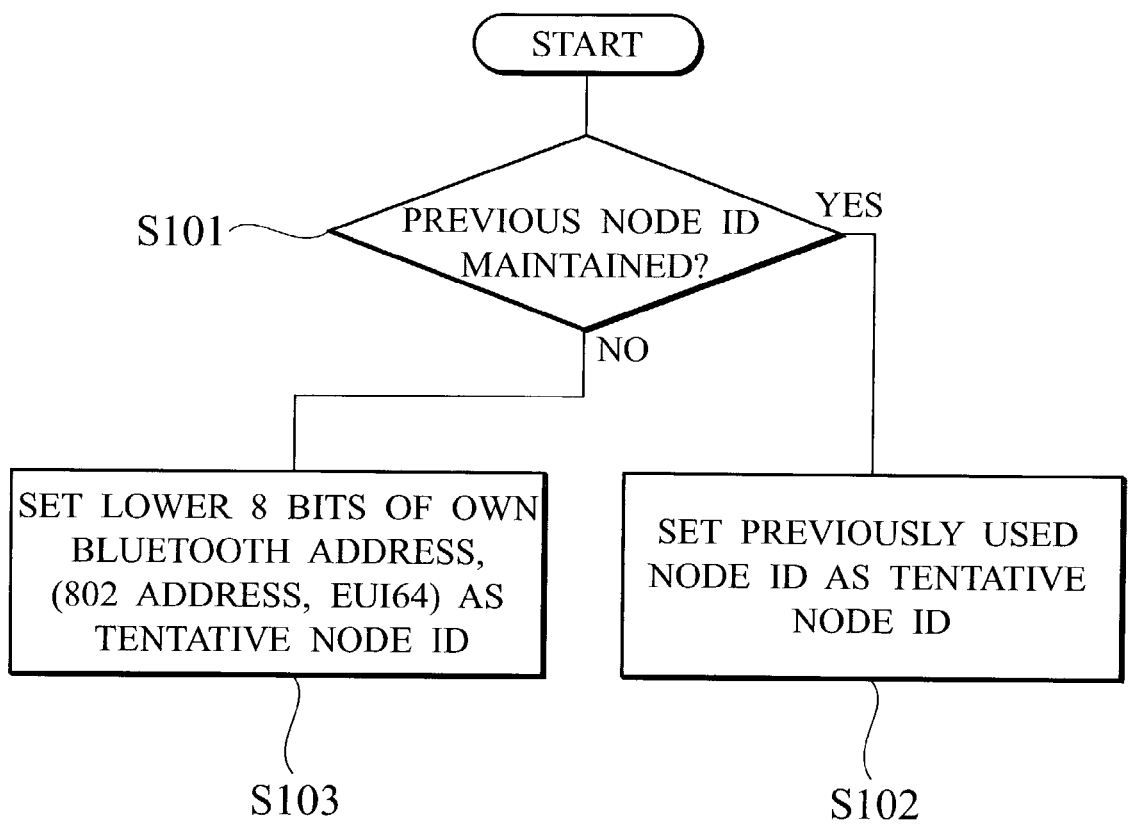
FIG. 15 is a flow chart showing an exemplary processing procedure for determining an initial value of a tentative node ID in the Echonet device according to the fourth embodiment of the present invention.

FIG. 15 shows an exemplary procedure at that time. As shown in FIG. 15, when that node maintains the previously used node ID value, that previously used node ID value will be used (S101, S102). In this way, it becomes possible for that node to maintain the same Echonet address (node ID) value in that subnet, so that it becomes possible for a device that is not robust to the change of the address value to reduce a risk of the address change as in the case where the other nodes within the subnet have some tables using the old node ID value of that node. Also, compared with a simple method in which "the Echonet node ID values are determined according to the numerical sequence starting from 1", it is possible to lower the possibility of having the address overlap with the other nodes.

On the other hand, when the previously used node ID value is not maintained (as in the case of joining to the network for the first time at that subnet or the case of the first activation after the purchase), similarly as in the previous embodiments, the lower 8 bits value of the own link layer address (hardware address) such as the Bluetooth address is set as an initial value (S101, S103). In this way, it is also possible to lower the possibility of having the address overlap with the other nodes. This is because the lower 8 bits values of the hardware addresses can be expected to be appropriately distributed.

Here, as an example, it is assumed that a value "Eb" is selected as the tentative node ID value according to the procedure of FIG. 15.

Now, the Echonet address server (i.e., the Echonet device S) that received this Echonet address initialization packet (SA2) transmits the Echonet address server reply packet for this packet (SA3), for the purpose of notifying to that node (the Echonet device C) that "the own node is the Echonet address server" and that "the use of that address is permitted (or not permitted)". This packet includes a value of the Echonet address (node ID) to be used by the Echonet device C (which is "Ec" in the example of FIG. 14).

In this embodiment, it is assumed that there is no overlap in the Echonet addresses within the subnet (that is, the other node that is using the value "Ec" does not exist), so that the Echonet address server (the Echonet device S) checks that there is surely no overlap of the Echonet address (node ID) within that subnet by referring to the internal address table, and then transmits this packet to the Echonet device C in a sense of giving a permission to use that value.

In the case where a node that is using the same value of the Echonet address (node ID)="Ec" exists (the case where the value "Eb" is already registered at the address table in the Echonet address server), the Echonet address server (the Echonet device S) selects a value of the node ID that is unused on that subnet as the Echonet address (node ID) to be used by the Echonet device C, and transmits the Echonet address server reply packet to the Echonet device C after entering this value as a value of "the Echonet node ID to be used".

FIG. 14 shows an exemplary case where "Ec" is selected as an unused value because "Eb" selected by the Echonet device C is already registered.

On the other hand, the other Echonet device within the subnet (the Echonet device B in the example of FIG. 14) also transmits the "Echonet address reply" that is a packet aimed at "notifying information regarding the own node to the Echonet device C", as a reply to the above described Echonet address initialization packet (SA4). This reply packet may be transmitted after waiting for a prescribed standby time (a value obtained by multiplying the own Echonet node ID value with a value of the constant T, for example) after receiving the Echonet address initialization packet, as has been described above. In this way, it is possible to prevent the replies to concentrate simultaneously at the Echonet device C.

This packet is returned by all the nodes within the subnet, so that the Echonet device C can obtain information on the Bluetooth addresses, the IP addresses and the Echonet addresses of all the Echonet devices within the subnet. As a consequence, it becomes possible for the Echonet device C to update the internal address table to the latest values at each occasion of the activation. This is very effective for a network in which the Echonet address value (or the IP address value) can possibly be changed, as in this embodiment.

Also, as described above, it is expected that such an "Echonet address reply" packet will be returned from all the Echonet nodes within the subnet, the Echonet device C may wait for a prescribed waiting time (the time T', for example). In this case, after waiting for the prescribed waiting time T', it is judged that "all the nodes have returned the Echonet address reply (or the Echonet address server reply)" (SA5).

Note that this "Echonet address initialization" packet may be broadcasted twice rather than broadcasting it only once. Also, in that case, it may be broadcasted consecutively, or it may be broadcasted after waiting for the above described prescribed waiting time T', for example. Also, with respect to the "Echonet address initialization packet" that is transmitted for several times, if a node that should reply to it has replied once, it may ignore this packet and omit to return a reply in the second and subsequent times (for a prescribed period of time after making a reply).

Now, the Echonet device C that is permitted to use the Echonet node ID value "Ec" by the Echonet address server (the Echonet device S) in this way (SA6) next broadcasts the net ID acquisition request packet (SA7). The Echonet device C that received a notice of the net ID value from some node (the Echonet router, for example) (SA8) determines the own entire Echonet address (NID+Ec) by combining these addresses (SA9).

Note that SA7 and SA8 may be omitted by acquiring the net ID value from a reply received from the other Echonet device such as that of SA3 or SA4.

Finally, the Echonet device C broadcasts this Echonet address value (NID+Ec) to the subnet or the entire Echonet, to notify that it has joined the Echonet (SA10).

Next, as another example of the Echonet address initialization procedure, the exemplary case of the distributed scheme in which the Echonet address server does not exist will be described.

Figure 16:
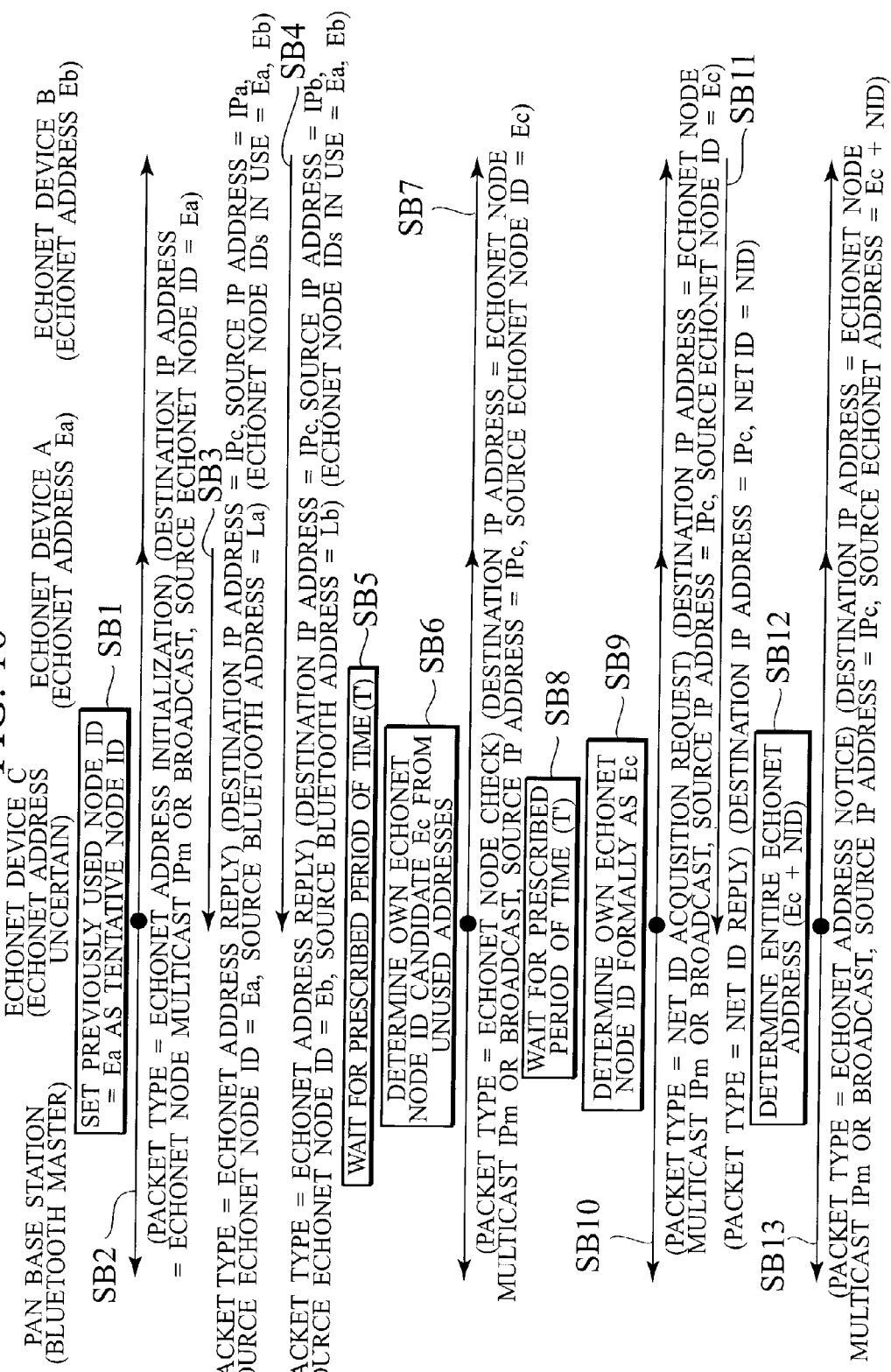
FIG. 16 is a sequence chart showing another exemplary Echonet address initialization sequence according to the fourth embodiment of the present invention.

FIG. 16 and FIG. 17 show an exemplary Echonet address initialization sequence for the case. Note that FIG. 16 shows the case where the address overlap occurs, and FIG. 17 shows the case where the address overlap does not occur. Here, the differences from the case of FIG. 14 will be mainly described.

First, the exemplary case in which the address overlap occurs will be described with reference to the sequence of FIG. 16.

Now, the Echonet device C proceeds to the procedure for determining the own Echonet address.

First, the Echonet device C that wishes to determine the Echonet address determines a tentative node ID which is a candidate for the own node ID (SB1), similarly as SA1 of FIG. 14. Here, as an example, it is assumed that a value "Ea" is selected as the tentative node ID value according to the procedure of FIG. 15.

Next, the Echonet device C which is a node that wishes to acquire the Echonet address broadcasts the Echonet address initialization packet (a packet that has triple roles of searching the Echonet address server, checking the node ID overlap, and requesting the address information notification) to the subnet (SB2), similarly as SA2 of FIG. 14.

This time the Echonet address server does not exists within the subnet, so that a node that transmits the Echonet address server reply does not exist. Note that this exemplary sequence (FIG. 16, FIG. 17) is also applied to the case where the Echonet address server originally existed but currently its server function is stopped for some reason (a trouble, for example) and the case where a node having the server function does not exist within the subnet.

Each of the other Echonet devices within the subnet (the Echonet devices A and B in this example) also transmits the "Echonet address reply" that is a packet aimed at "notifying information regarding the own node to the Echonet device C", as a reply to the above described Echonet address initialization packet (SB3, SB4). This reply packet may be transmitted after waiting for a prescribed standby time (a value obtained by multiplying the own Echonet node ID value with a value of the constant T, for example) after receiving the Echonet address initialization packet, as has been described above.

Note that, in this case, the value of the tentative node ID (="Ea") originally determined by the Echonet device C coincides with the value of the Echonet node ID of the Echonet device A, so that the Echonet address reply packet returned by the Echonet device A (SB3) indicates that "this node is using the value of node ID=Ea".

Note that this Echonet address reply may contain "all values of the node IDs of the Echonet nodes currently used within that subnet" as recognized by each Echonet node. For example, if the values of the node IDs from 0 to 255 can possibly exist, a bit sequence with a length of 256 bits corresponding to these values is provided and a reply is made in such a form that "1 is set to a bit corresponding to the node ID of a node that is regarded as currently existing within the subnet, and 0 is set to a bit corresponding to the node ID of a node that is regarded as currently not existing within the subnet, in this bit sequence", so that it suffices to use information with a length of 256 bits.

This packet is returned by all the nodes within the subnet, so that the Echonet device C can obtain information on the Bluetooth addresses, the IP addresses and the Echonet addresses of all the Echonet devices within the subnet. As a consequence, it becomes possible for the Echonet device C to update the internal address table to the latest values at each occasion of the activation.

Also, as described above, it is expected that such an "Echonet address reply" packet will be returned from all the Echonet nodes within the subnet, the Echonet device C may wait for a prescribed waiting time (the time T', for example). In this case, after waiting for the prescribed waiting time T', it is judged that "all the nodes have returned the Echonet address reply (or the Echonet address server reply)" (SB5).

Here, when it is ascertained that the other node is using the value of the own tentative node ID (="Ea"), a value of the Echonet address (node ID) that is currently not used within that subnet is calculated from the Echonet address reply packets received until then, and this is set as a new tentative node ID. Here, it is assumed that "Ec" is set as the new tentative node ID (SB6).

The Echonet device C broadcasts the "Echonet node check" packet which is a packet for "checking whether a node that has the overlapping Echonet node ID value exists within the subnet or not", within the subnet in order to check the overlap of this value "Ec" (SB7). When the overlapping node exists, this procedure (the procedure of SB6 to SB9) is repeated until the Echonet node ID value is determined. In this example, a node that has the overlapping node ID does not exist within the subnet, so that after waiting for a prescribed time T', for example (SB8), this node ID (="Ec") is formally determined as the own Echonet node ID (SB9).

Thereafter, similarly as in the case of the exemplary sequence of FIG. 14, the net ID acquisition is carried out (SB10, SB11), the entire Echonet address is determined (SB12), and the broadcast for notifying this address to the entire Echonet (the broadcast within domain) is carried out (SB13).

Note that SB10 and SB11 may be omitted by acquiring the net ID value from a reply received from the other Echonet device such as that of SB3 or SB4.

On the other hand, FIG. 17 shows the sequence in the case where a node that has the overlapping Echonet node ID (="Ec") does not exist within the subnet.

In this case, all the replies to the Echonet address initialization packet (SC2) are collected (SC3 to SC5), and it is checked that a node that is using the same node ID value does not exist within the subnet (the case where there is no reply from a node that has the same node ID, and this node ID value is absent in the list of currently used node IDs notified from each node), so that at this point the node ID=Ec is determined as the own Echonet node ID (SC6).

The subsequent procedure is similar to the case of FIG. 16. Note that, even in this case, SC7 and SC8 may be omitted by acquiring the net ID value from a reply received from the other Echonet device such as that of SC3 or SC4.

Note that, in the embodiments described above, the Echonet protocol is used as a protocol for controlling devices connected to the network, but the present invention is not limited to this specific case and also applicable to the other various control protocols.

Also, in the above, the exemplary cases of using the Bluetooth or the IP (IP over Bluetooth) as the local area network, but the present invention is also applicable to the networks in the other schemes.

Also, in the above, the exemplary case of using the home network as the local area network, but the present invention is also applicable to the other local area network such as intranet.

As described, according to the present invention, it is possible to determine the Echonet address of the own communication device efficiently.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the communication device of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication device for carrying out communications according to a prescribed control protocol on a network of a prescribed network layer protocol, comprising:

an interface unit configured to make connections to the network of the prescribed network layer protocol;

a control protocol processing unit configured to carry out processing regarding data of the prescribed protocol that are transmitted/received through the network of the prescribed network layer protocol;

a memory unit configured to store address correspondence information that contains in correspondence a network layer address to be used by each communication device on the network of the prescribed network layer protocol and a prescribed address to be used by each communication device in the prescribed control protocol, for the communication device and other communication devices that are connected to the network of the prescribed network layer protocol;

a transmission/reception unit configured to carry out transmission/reception of packets of the prescribed network layer protocol, in which packets of the prescribed control protocol are encapsulated;

a determination unit configured to set a prescribed bit sequence value of the network layer address or a datalink layer address of the communication device as a candidate for the prescribed address, transmit an inquiry packet for inquiring whether the prescribed bit sequence value is identical to the prescribed address used by each one of the other communication devices or not, to each one of the other communication devices connected to the network of the prescribed network layer protocol, and determine the prescribed bit sequence value as the proscribed address of the communication device when the prescribed bit sequence value is judged as not identical to any of prescribed addresses used by the other communication devices; and a reply unit configured to receive the inquiry packet that requests a prescribed reply regarding the prescribed address currently used by the communication device from another communication device connected to the network of the prescribed network layer protocol, and return a reply packet for the inquiry packet after waiting for a standby time determined by a method according to the prescribed address currently used by the communication device in a case of replying to the inquiry packet, wherein when the prescribed bit sequence value is judged as identical to one of the prescribed addresses used by the other communication devices, the determination unit transmits the inquiry packet for inquiring the prescribed address used by each one of the other communication devices, to each one of the other communication devices connected to the network of the prescribed network layer protocol, receives reply packets containing the prescribed addresses of the other communication devices that are returned from the other communication devices while waiting for a prescribed waiting time, and determines the prescribed address of the communication device according to the prescribed addresses of the other communication devices contained in the reply packets, wherein the determination unit determines one prescribed address selected according to a prescribed selection method from all or a part of prescribed addresses existing in the prescribed control protocol except for those prescribed addresses contained in the reply packets, as a prescribed address candidate for the communication device, wherein the determination unit carries out a procedure of transmitting a packet for inquiring whether the prescribed address candidate is identical to the prescribed address used by each one of the other communication devices or not to each one of the other communication devices connected to the network of the prescribed network layer protocol and thereafter waiting for a return of a replay packet indicating that the prescribed address identical to the prescribed address candidate is used from one of the other communication devices during the prescribed waiting time, for once or for a prescribed number of times, and determines the prescribed address candidate as the prescribed address of the communication device when the reply packet indicating that the prescribed address identical to the prescribed address candidate is used is not returned from any of the other communication devices while carrying out the procedure for once or for the prescribed number of times, and wherein when the reply packet indicating that the prescribed address identical to the prescribed address candidate is used is returned from one of the other communication devices while carrying out the procedure for once or for the prescribed number of times, the determination unit selects another prescribed address from all or a part of prescribed addresses existing in the prescribed control protocol except for those prescribed addresses contained in the reply packets and a previous prescribed address candidate, as the prescribed address candidate for the communication device, and transmits again the packet for inquiring whether the prescribed address candidate is identical to the prescribed address used by each one of the other communication devices or not to each one of the other communication devices connected to the network of the prescribed network layer protocol.

2. A communication device for carrying out communications according to a prescribed control protocol on a network of a prescribed network layer protocol, comprising:

an interface unit configured to make connections to the network of the prescribed network layer protocol;

a control protocol processing unit configured to carry out processing regarding data of the prescribed control protocol that are transmitted/received through the network of the prescribed network layer protocol;

a memory unit configured to store address correspondence information that contains in correspondence a network layer address to be used by each communication device on the network of the prescribed network layer protocol and a prescribed address to be used by each communication device in the prescribed control protocol, for the communication device and other communication devices that are connected to the network of the prescribed network layer protocol;

a transmission/reception unit configured to carry out transmission/reception of packets of the prescribed network layer protocol, in which packets of the prescribed control protocol are encapsulated;

a determination unit configured to set a prescribed bit sequence value of the network layer address or a datalink layer address of the communication device as a candidate for the prescribed address, transmit an inquiry packet for inquiring whether the prescribed bit sequence value is identical to the prescribed address used by each one of the other communication devices or not, to each one of the other communication devices connected to the network of the prescribed network layer protocol, and determine the prescribed bit sequence value as the prescribed address of the communication device when the prescribed bit sequence value is judged as not identical to any of prescribed addresses used by the other communication devices; and a reply unit configured to receive the inquiry packet that requests a prescribed reply regarding the prescribed address currently used by the communication device from other communication device connected to the network of the prescribed network layer protocol, and return a reply packet for the inquiry packet after waiting for a standby time determined by a method according to the prescribed address currently used by the communication device in a case of replying to the inquiry packet, wherein when the prescribed bit sequence value is judged as identical to one of the prescribed addresses used by the other communication devices, the determination unit transmits the inquiry packet for inquiring the prescribed address used by each one of the other communication devices, to each one of the other communication devices connected to the network of the prescribed network layer protocol, receives reply packets containing the prescribed addresses of the other communication devices that are returned from the other communication devices while waiting for prescribed waiting time, and determines the prescribed address of the communication device according to the prescribed addresses of the other communication devices contained in the reply packets, wherein the standby time is a time corresponding to a value obtained by entering a value of the prescribed address of the communication device into a prescribed function for distributing output values within a prescribed range with respect to input values given by prescribed addresses, wherein the other communication devices have a parameter for making the prescribed range of the prescribed function different, and wherein the determination unit selects a value of the parameter to be used according to prescribed criteria and transmits the inquiry packet that contains information for specifying a selected value of the parameter to be used.

3. A communication device for carrying out communications according to a prescribed control protocol on a network of a prescribed network layer protocol, comprising:

an interface unit configured to make connections to the network of the prescribed network layer protocol;

a control protocol processing unit configured to carry out processing regarding data of the prescribed control protocol that are transmitted/received through the network of the prescribed network layer protocol;

a memory unit configured to store address correspondence information that contains in correspondence a network layer address to be used by each communication device on the network of the prescribed network layer protocol and prescribed address to be used by each communication device in the prescribed control protocol, for the communication device and other communication devices that are connected to the network of the prescribed network layer protocol;

a transmission/reception unit configured to carry out transmission/reception of packets of the prescribed network layer protocol, in which packets of the prescribed control protocol are encapsulated;

a determination unit configured to set a prescribed bit sequence value of the network layer address or a datalink layer address of the communication device as a candidate for the prescribed address, transmit an inquiry packet for inquiring whether the prescribed bit sequence value is identical to the prescribed address used by each one of the other communication devices or not, to each one of the other communication devices connected to the network of the prescribed network layer protocol, and determine the prescribed bit sequence value as the prescribed address of the communication device when the prescribed bit sequence value is judged as not identical to any of prescribed addresses used by the other communication devices; and a reply unit configured to receive the inquiry packet that requests a prescribed reply regarding the prescribed address currently used by the communication device from another communication device connected to the network of the prescribed network layer protocol, and return a reply packet for the inquiry packet after waiting for a standby time determined by a method according to the prescribed address currently used by the communication device in a case of replying to the inquiry packet.

wherein when the prescribed bit sequence value is judged as identical to one of the prescribed addresses used by the other communication devices, the determination unit transmits the inquiry packet for inquiring the prescribed address used by each one of the other communication devices, to each one of the other communication devices connected to the network of the prescribed network layer protocol, receives reply packets containing the prescribed addresses of the other communication devices that are returned from the other communication devices while waiting for a prescribed waiting time, and determines the prescribed address of the communication device according to the prescribed addresses of the other communication devices contained in the reply packets, wherein the standby time is a time corresponding to a value obtained by entering a value of the prescribed address of the communication device into a prescribed function for distributing output values within a prescribed range with respect to input values given by prescribed addresses, wherein the other communication devices have plural types of the prescribed function with different values for the prescribed range, and wherein the determination unit selects a type of the prescribed function to be used according to prescribed criteria and transmits the inquiry packet that contains information for specifying a selected type of the prescribed function to be used.

* * * * *